US011821461B2

(12) United States Patent
Ou et al.

(10) Patent No.: US 11,821,461 B2
(45) Date of Patent: Nov. 21, 2023

(54) SLIDING COMPONENTS

(71) Applicant: Eagle Industry Co., Ltd., Tokyo (JP)

(72) Inventors: Iwa Ou, Tokyo (JP); Tadatsugu Imura, Tokyo (JP); Hiroshi Suzuki, Tokyo (JP)

(73) Assignee: EAGLE INDUSTRY CO., LTD.

( * ) Notice: Subject to any disclaimer, the term of this patent is extended or adjusted under 35 U.S.C. 154(b) by 206 days.

(21) Appl. No.: 17/428,912

(22) PCT Filed: Feb. 12, 2020

(86) PCT No.: PCT/JP2020/005258
§ 371 (c)(1),
(2) Date: Aug. 5, 2021

(87) PCT Pub. No.: WO2020/166588
PCT Pub. Date: Aug. 20, 2020

(65) Prior Publication Data
US 2022/0120313 A1    Apr. 21, 2022

(30) Foreign Application Priority Data
Feb. 15, 2019 (JP) .................................. 2019-026035

(51) Int. Cl.
*F16J 15/34* (2006.01)
*F16C 17/02* (2006.01)

(52) U.S. Cl.
CPC .......... *F16C 17/024* (2013.01); *F16J 15/3412* (2013.01)

(58) Field of Classification Search
CPC ...... F16J 15/34; F16J 15/3404; F16J 15/3408; F16J 15/3412; F16C 17/024
See application file for complete search history.

(56) References Cited

U.S. PATENT DOCUMENTS 3,804,424 A    4/1974  Gerdner ................... F16J 15/34
4,889,348 A   12/1989  Amundson et al. ..... F16J 15/34
(Continued)

FOREIGN PATENT DOCUMENTS

CH      677266     10/1987  ............... F16J 15/34
CN     1100503      3/1995  ............... F16J 15/16
(Continued)

OTHER PUBLICATIONS

Chinese Official Action issued in related Application 202080010640.4, dated Jul. 29, 2022, 15 pages.
(Continued)

*Primary Examiner* — Gilbert Y Lee
(74) *Attorney, Agent, or Firm* — HAYES SOLOWAY P.C.

(57) ABSTRACT

A pair of sliding components formed in an annular shape and disposed at a relatively rotating position of a rotary machine are constituted by a first sliding component 10 and a second sliding component. A sliding surface of the first sliding component has a plurality of dynamic pressure generation mechanisms each of which includes at least a shallow groove communicating with a leakage side. A sliding surface of the second sliding component has deep grooves each of which has a dimension deeper than that of the shallow groove of each of the dynamic pressure generation mechanisms and communicates with the leakage side, each of the deep grooves overlapping with the shallow groove each of the dynamic pressure generation mechanisms during relative rotation of the first and second sliding components.

16 Claims, 13 Drawing Sheets

(56) References Cited

U.S. PATENT DOCUMENTS

| | | | | |
|---|---|---|---|---|
| 5,092,612 | A | 3/1992 | Victor et al. | F16J 15/34 |
| 5,180,173 | A | 1/1993 | Kimura et al. | F16J 15/34 |
| 5,441,283 | A | 8/1995 | Pecht et al. | F16J 15/34 |
| 5,492,341 | A | 2/1996 | Pecht et al. | F16J 15/34 |
| 6,189,896 | B1 | 2/2001 | Dickey | F16C 17/045 |
| 7,044,470 | B2 | 5/2006 | Zheng | F16J 15/342 |
| 9,039,013 | B2* | 5/2015 | Artiles | F16J 15/3412 277/400 |
| 9,151,390 | B2 | 10/2015 | Hosoe et al. | |
| 9,353,867 | B2 | 5/2016 | Itadani et al. | F16J 15/3448 |
| 9,371,912 | B2 | 6/2016 | Hosoe et al. | F16J 15/34 |
| 9,512,923 | B2 | 12/2016 | Inoue et al. | F16J 16/34 |
| 9,677,670 | B2 | 6/2017 | Itadani et al. | F16J 15/3412 |
| 9,765,892 | B2 | 9/2017 | Itadani et al. | F16J 15/34 |
| 9,772,037 | B2 | 9/2017 | Itadani et al. | F16J 15/3412 |
| 9,829,109 | B2 | 11/2017 | Itadani et al. | F16J 15/40 |
| 9,841,106 | B2 | 12/2017 | Itadani et al. | F16J 15/34 |
| 9,845,886 | B2 | 12/2017 | Itadani | |
| 9,850,953 | B2 | 12/2017 | Tokunaga | F16C 33/741 |
| 10,054,230 | B2 | 8/2018 | Katori | F16J 15/34 |
| 10,337,560 | B2 | 7/2019 | Tokunaga et al. | F16J 15/40 |
| 10,473,220 | B2 | 11/2019 | Tokunaga et al. | F16J 15/34 |
| 10,704,417 | B2 | 7/2020 | Tokunaga et al. | F01D 25/16 |
| 11,603,934 | B2 | 3/2023 | Imura | F16J 15/34 |
| 2002/0079648 | A1 | 6/2002 | Uth | F16J 15/34 |
| 2010/0038862 | A1 | 2/2010 | Young | B23K 26/352 |
| 2012/0018957 | A1 | 1/2012 | Watanabe | F16J 15/34 |
| 2012/0280458 | A1 | 11/2012 | Artiles et al. | F16J 15/44 |
| 2014/0197660 | A1 | 7/2014 | Hosoe et al. | F16J 15/40 |
| 2014/0217676 | A1 | 8/2014 | Hosoe et al. | F16J 15/34 |
| 2015/0097341 | A1 | 4/2015 | Inoue et al. | F16J 15/3424 |
| 2015/0115537 | A1 | 4/2015 | Tokunaga | F16J 15/34 |
| 2015/0123350 | A1 | 5/2015 | Itadani et al. | F16J 15/3412 |
| 2015/0184752 | A1* | 7/2015 | Itadani | F16J 15/3412 277/400 |
| 2015/0226334 | A1* | 8/2015 | Itadani | F16J 15/3412 277/400 |
| 2015/0260292 | A1 | 9/2015 | Inoue | F16J 15/342 |
| 2016/0033045 | A1 | 2/2016 | Itadani et al. | F16J 15/3412 |
| 2017/0350407 | A1 | 12/2017 | Yamamoto et al. | F04D 29/046 |
| 2018/0073394 | A1 | 3/2018 | Tokunaga et al. | F01D 25/18 |
| 2018/0128377 | A1 | 5/2018 | Tokunaga et al. | F16J 15/342 |
| 2018/0135699 | A1 | 5/2018 | Tokunaga et al. | F16C 33/80 |
| 2018/0172162 | A1 | 6/2018 | Tokunaga et al. | F16J 15/34 |
| 2018/0299015 | A1 | 10/2018 | Itadani | F16J 15/3448 |
| 2019/0285115 | A1 | 9/2019 | Negishi et al. | F16C 17/04 |
| 2019/0301522 | A1 | 10/2019 | Negishi et al. | F16C 17/026 |
| 2023/0167905 | A1* | 6/2023 | Negishi | F16J 15/3416 277/400 |

FOREIGN PATENT DOCUMENTS

| | | | | |
|---|---|---|---|---|
| CN | 1364987 | 8/2002 | | F16J 15/40 |
| CN | 101469771 | 7/2009 | | F16J 15/40 |
| CN | 102483162 | 5/2012 | | F16J 15/18 |
| CN | 103104707 | 5/2013 | | F16J 15/16 |
| CN | 103122998 | 5/2013 | | F16J 15/16 |
| CN | 103216626 | 7/2013 | | F16J 15/40 |
| CN | 103732958 | 4/2014 | | F16J 15/34 |
| CN | 103765060 | 4/2014 | | F16J 15/34 |
| CN | 104169622 | 11/2014 | | F16J 15/34 |
| CN | 104334939 | 2/2015 | | F16J 15/34 |
| CN | 104919229 | 9/2015 | | F16J 15/34 |
| CN | 105793628 | 7/2016 | | F16J 15/34 |
| CN | 106015571 | 10/2016 | | F16J 15/16 |
| CN | 106104112 | 11/2016 | | F16J 15/35 |
| CN | 106352093 | 1/2017 | | F16J 15/34 |
| CN | 106763778 | 5/2017 | | F16J 15/16 |
| CN | 107407424 | 11/2017 | | F16J 15/34 |
| CN | 107532725 | 1/2018 | | F16J 15/34 |
| CN | 107735604 | 2/2018 | | F16J 15/34 |
| DE | 2444544 | 9/1974 | | F16J 15/34 |
| DE | 69113539 | 1/1992 | | F16J 15/34 |
| DE | 102008038396 | 2/2010 | | F16J 15/34 |
| EP | 2 977 654 | 1/2016 | | F16J 15/34 |
| EP | 3 091 258 | 11/2016 | | F16J 15/34 |
| EP | 3 543 569 | 9/2019 | | F16J 15/34 |
| FR | 2342440 | 9/1977 | | F16J 15/34 |
| JP | 50-45155 | 4/1975 | | F16J 15/34 |
| JP | 56-15856 | 2/1981 | | F16J 15/34 |
| JP | 4-50559 | 2/1992 | | F16J 15/34 |
| JP | 5-164249 | 6/1993 | | F16J 15/34 |
| JP | 6-174107 | 6/1994 | | F16J 15/34 |
| JP | 7-71618 | 3/1995 | | F16J 15/34 |
| JP | 8-502809 | 3/1996 | | F16J 15/34 |
| JP | 8-303606 | 11/1996 | | F16J 15/34 |
| JP | 3079562 | 6/2000 | | F16J 15/34 |
| JP | 2002-286026 | 10/2002 | | F16C 17/02 |
| JP | 2011-74931 | 4/2011 | | F16J 15/34 |
| JP | 2012-2295 | 1/2012 | | F16J 15/34 |
| JP | 2012-159152 | 8/2012 | | F16J 15/34 |
| JP | 2017-141962 | 8/2017 | | F16J 15/34 |
| JP | 2018-200068 | 12/2018 | | F16J 15/34 |
| JP | 6941479 B2* | 9/2021 | | |
| WO | WO 95/06212 | 3/1995 | | F16J 15/34 |
| WO | WO 2012/046749 | 4/2012 | | F16C 17/04 |
| WO | WO 2013/035503 | 3/2013 | | F16J 15/34 |
| WO | WO2013035502 | 3/2013 | | F16J 15/34 |
| WO | WO 2013/176009 | 11/2013 | | F16J 15/34 |
| WO | WO 2014/024742 | 2/2014 | | F16J 15/34 |
| WO | WO 2014/148317 | 9/2014 | | F16J 15/34 |
| WO | WO 2015/199171 | 12/2015 | | F16J 15/34 |
| WO | WO 2015/199172 | 12/2015 | | F16J 15/34 |
| WO | WO 2016/167262 | 10/2016 | | F16J 15/34 |
| WO | WO 2016/186015 | 11/2016 | | F16J 15/34 |
| WO | WO 2016/186019 | 11/2016 | | F16J 15/08 |
| WO | WO 2016/203878 | 12/2016 | | F16J 15/34 |
| WO | WO 2017/061406 | 4/2017 | | F16J 15/34 |
| WO | WO2018092742 | 5/2018 | | F16J 15/34 |
| WO | WO 2018/105505 | 6/2018 | | F16C 33/12 |
| WO | WO2019139107 | 7/2019 | | F16J 15/34 |

OTHER PUBLICATIONS

Chinese Official Action issued in related Application 202080012996. 1, dated Aug. 1, 2022, 13 pages.
Chinese Official Action issued in related Application 202080012995. 7, dated Aug. 1, 2022, 13 pages.
Extended European Search Report issued in EPO Patent Appln. Serial No. 20752802, dated Oct. 11, 2022, 7 pages.
Extended European Search Report issued in EPO Patent Appln. Serial No. 20755793, dated Oct. 11, 2022, 29 pages.
Extended European Search Report issued in EPO Patent Appln. Serial No. 20755569, dated Oct. 11, 2022, 10 pages.
Extended European Search Report issued in EPO Patent Appln. Serial No. 18854496.8, dated Apr. 12, 2021, 8 pages.
International Search Report and Written Opinion (w/machine translation) issued in PCT/JP2018/032791, dated Nov. 27, 2018 (17 pgs).
International Preliminary Report on Patentability issued in PCT/JP2018/032701, dated Mar. 18, 2020, 8 pages.
International Search Report and Written Opinion issued in PCT/JP2020/005259, dated Apr. 7, 2020, with English translation, 23 pages.
International Preliminary Report on Patentability issued in PCT/JP2020/005259 dated Aug. 10, 2021, 13 pages.
International Search Report and Written Opinion issued in PCT/JP2020/005258, dated Apr. 14, 2020, with English translation 12 pages.
International Preliminary Report on Patentability issued in PCT/JP2020/005258, dated Aug. 10, 2021, 6 pages.
International Search Report and Written Opinion issued in PCT/JP2020/003646, dated Mar. 17, 2020, with English translation, 12 pages.
International Preliminary Report on Patentability issued in PCT/JP2020/003646, dated Aug. 10, 2021, 6 pages.
Office Action issued in Chinese Patent Appln. No. 201880055818, dated May 5, 2021, with English translation, 11 pages.
Office Action issued in Korean Patent Appln. No. 10-2020-7006713, dated Jun. 28, 2021, with English translation, 11 pages.

(56) References Cited

OTHER PUBLICATIONS

Chinese Official Action issued in related Application 202080012995.7, dated Feb. 12, 2023 12 pages.
Chinese Official Action issued in related Application 202080010640.4, dated Dec. 2, 2022, 16 pages.
Chinese Official Action issued in related Application 202080010640.4, dated Mar. 19, 2023, 15 pages.
Chinese Official Action issued in related Application 202080012995.7, dated Jul. 17, 2023 8 pages
Korean Official Action issued in related Korean Patent Application Serial No. 10-2021-7028346, dated Jun. 22, 2023, 14 pages with translation.
Korean Official Action issued in related Korean Patent Application Serial No. 10-2021-7025875, dated May 25, 2023, 12 pages with translation.
Korean Official Action issued in related Korean Patent Application Serial No. 10-2021-7028878, dated Jun. 28, 2023, 14 pages with translation.
Japanese Official Action issued in related Japanese Patent Application Serial No. 2020-572261, dated Apr. 17, 2023, 6 pages with translation.
Notice of Allowance issued in U.S. Appl. No. 17/428,262, dated May 3, 2023, 13 pages.
U.S. Appl. No. 16/640,324, filed Feb. 19, 2020, Sasaki et al.
U.S. Appl. No. 17/428,262, filed Aug. 3, 2021, Imura et al.
U.S. Appl. No. 17/425,679, filed Jul. 23, 2021, Ou et al.

* cited by examiner (a)

(b)

(a) 
(b) 
(c) 
(d)

(a)

(b)

(a)

(b)

(b)

SLIDING COMPONENTS

TECHNICAL FIELD

The present invention relates to relatively rotating sliding components, for example, sliding components used in a shaft sealing device axially sealing a rotation shaft of a rotary machine in an automobile, a general industrial machine, or other sealing fields or sliding components used in a bearing of a machine in an automobile, a general industrial machine, or other bearing fields.

BACKGROUND ART

As a shaft sealing device for preventing a leakage of a sealed liquid, for example, a mechanical seal includes a pair of annular sliding components which rotates relative to each other so that their sliding surfaces are in slidable contact with each other. In such a mechanical seal, it has been recently desired to reduce energy lost due to sliding for environmental measures and sliding components such as Patent Citation 1 have been developed to reduce the energy lost due to sliding by improving the lubricity between sliding surfaces.

For example, in the sliding components shown in Patent Citation 1, a dynamic pressure generation groove is provided in a sliding surface of the sliding component to communicate with an outer radial side which is a sealed liquid side and to close one end in the sliding surface. Accordingly, when the sliding components rotate relative to each other, the sliding surfaces are separated from each other due to a dynamic pressure thereof since the sealed fluid flowing from the sealed liquid side into the dynamic pressure generation groove flows out from the circumferential end of the dynamic pressure generation groove to a gap between the sliding surfaces. At the same time, lubricity is improved since the dynamic pressure generation groove holds the sealed liquid. As a result, low friction is realized.

Further, as the dynamic pressure generation groove, one shown in Patent Citation 2 is also known. The dynamic pressure generation groove of Patent Citation 2 is formed in a spiral shape which extends in an arc shape from an outer radial side corresponding to a sealed liquid side to an inner radial side corresponding to a leakage side and of which an inner radial end portion is tapered.

CITATION LIST

Patent Literature

Patent Citation 1: JP H4-50559 A (Page 3, FIG. 2)
Patent Citation 2: JP 3079562 B2 (Page 4, FIG. 2)

SUMMARY OF INVENTION

Technical Problem

The sealed fluid shown in Patent Citations 1 and 2 may contain contamination such as abrasion powder and dust generated by sliding between sliding surfaces and contamination mixed in the sealed fluid is guided to the end of the dynamic pressure generation groove due to the fluid flowing in the dynamic pressure generation groove to thereby easily accumulate therein. When contamination is accumulated in the end of the dynamic pressure generation groove, there is concern that a dynamic pressure generation function of the dynamic pressure generation groove may be deteriorated or the sliding surfaces may non-uniformly contact each other. In the present application, contamination means "particulate foreign matter" such as polyfine particulate conductive foreign matter.

The present invention has been made in view of such problems and an object of the present invention is to provide sliding components capable of suppressing contamination from being accumulated in a shallow groove of a dynamic pressure generation mechanism.

Solution to Problem

In order to solve the foregoing problems, a pair of sliding components according to the present invention is formed in an annular shape and disposed at a relatively rotating position of a rotary machine, wherein the pair of sliding components is constituted by a first sliding component and a second sliding component, a sliding surface of the first sliding component is provided with a plurality of dynamic pressure generation mechanisms each of which includes at least a shallow groove communicating with a leakage side, a sliding surface of the second sliding component is provided with deep grooves each of which has a dimension deeper than that of the shallow groove of each of the dynamic pressure generation mechanisms and communicates with the leakage side, and each of the deep grooves overlapping with the shallow groove each of the dynamic pressure generation mechanisms during relative rotation of the first and second sliding components. According to the aforesaid feature of the present invention, when the pair of sliding components rotates relative to each other, the deep groove crosses over the shallow groove of the dynamic pressure generation mechanism, the deep groove communicates with the shallow groove of the dynamic pressure generation mechanism at that timing, and contamination is not easily accumulated in the shallow groove of the dynamic pressure generation mechanism due to a fluid moving from the shallow groove to the deep groove.

It may be preferable that the shallow groove of each of the dynamic pressure generation mechanisms and each of the deep grooves extend in a same direction. According to this preferable configuration, the shallow groove of the dynamic pressure generation mechanism and the deep groove can communicate with each other in a wide region and a fluid can also be moved from a portion other than the end of the shallow groove to the deep groove side.

It may be preferable that an opening width of a portion of each of the deep grooves at least overlapping with a closed end side of the shallow groove of each of the dynamic pressure generation mechanisms is formed to be longer than an opening width of the shallow groove. According to this preferable configuration, since the shallow groove of the dynamic pressure generation mechanism and the deep groove can communicate with each other for a long time, contamination in the shallow groove easily flows into the deep groove.

It may be preferable that a total area of an opening surface of each of the deep grooves is smaller than a total area of an opening surface of each of the shallow grooves. According to this preferable configuration, since it is possible to ensure a wide region in which the shallow groove of the dynamic pressure generation mechanism and the deep groove do not communicate with each other during the relative rotation of the sliding components, a dynamic pressure can be efficiently generated by the dynamic pressure generation mechanism.

It may be preferable that the second sliding component is configured to be rotated, the deep groove communicating with an outer radial side of the second sliding component as the leakage side. According to this preferable configuration, contamination in the deep groove can be discharged to the outer radial side by a centrifugal force.

It may be preferable that the sliding surface of any one of the first and second sliding components is provided with at least one specific dynamic pressure generation mechanism which is disposed on a sealed fluid side with respect to the dynamic pressure generation mechanisms and is independent from the dynamic pressure generation mechanisms. According to this preferable configuration, it is possible to reduce the leakage of the sealed liquid to the leakage side using the dynamic pressure generation mechanism while generating an appropriate liquid film between the sliding surfaces by separating the sliding surfaces using the specific dynamic pressure generation mechanism during the relative rotation of the sliding components.

DESCRIPTION OF EMBODIMENTS

Figure 1:
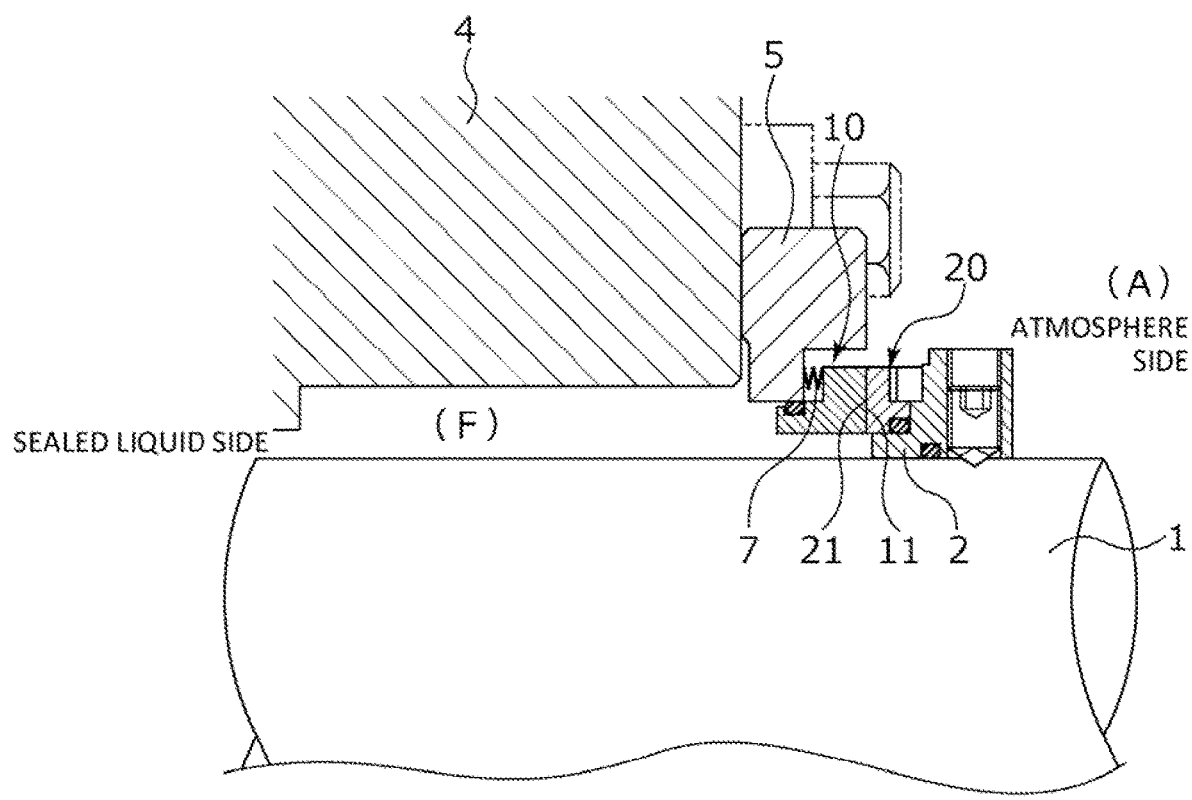
FIG. 1 is a longitudinal sectional view illustrating an example of a mechanical seal including a pair of sliding components according to a first embodiment of the present invention.

Modes for implementing sliding components according to the present invention will be described below based on embodiments.

First Embodiment

A pair of sliding components according to a first embodiment of the present invention will be described with reference to FIGS. 1 to 9. Additionally, in this embodiment, an example in which the sliding component is a mechanical seal will be described. Further, an outer radial side of the sliding component constituting the mechanical seal will be described as an atmosphere side (i.e., low-pressure side) which is a leakage side and an inner radial side thereof will be described as a sealed liquid side (i.e., high-pressure side). Further, for convenience of description, dots may be added to grooves and the like formed on a sliding surface in the drawings.

A mechanical seal for a general industrial machine illustrated in FIG. 1 is an outside type that seals a sealed liquid F that tends to leak from the inner radial side of the sliding surface toward the outer radial side thereof and mainly includes a rotating seal ring 20 which is an annular sliding component provided in a rotation shaft 1 through a sleeve 2 to be rotatable together with the rotation shaft 1 and a stationary seal ring 10 which is an annular sliding component provided in a seal cover 5 fixed to a housing 4 of an installation target device not to be rotatable and to be movable in the axial direction. When the stationary seal ring 10 is biased in the axial direction by a bellows 7, a sliding surface 11 of the stationary seal ring 10 and a sliding surface 21 of the rotating seal ring 20 slide closely with each other.

The stationary seal ring 10 and the rotating seal ring 20 are typically formed of SiC (as an example of hard material) or a combination of SiC (as the example of hard material) and carbon (as a example of the soft material), but the present invention is not limited thereto. Any sliding material is applicable as long as the sliding material is used as the sliding material for the mechanical seal. In addition, examples of SiC include a sintered body using boron, aluminum, carbon, and the like as a sintering aid and materials composed of two or more types of phases having different components and compositions, for example, SiC obtained by dispersing graphite particles, reaction sintered SiC composed of SiC and Si, SiC—TiC, SiC—TiN, and the like and examples of carbon include carbon obtained by mixing carbon materials and graphite materials, resin molded carbon, sintered carbon, and the like. In addition to the above sliding materials, metal materials, resin materials, surface modification materials (e.g., coating materials), composite materials, and the like can also be applied.

Figure 2:
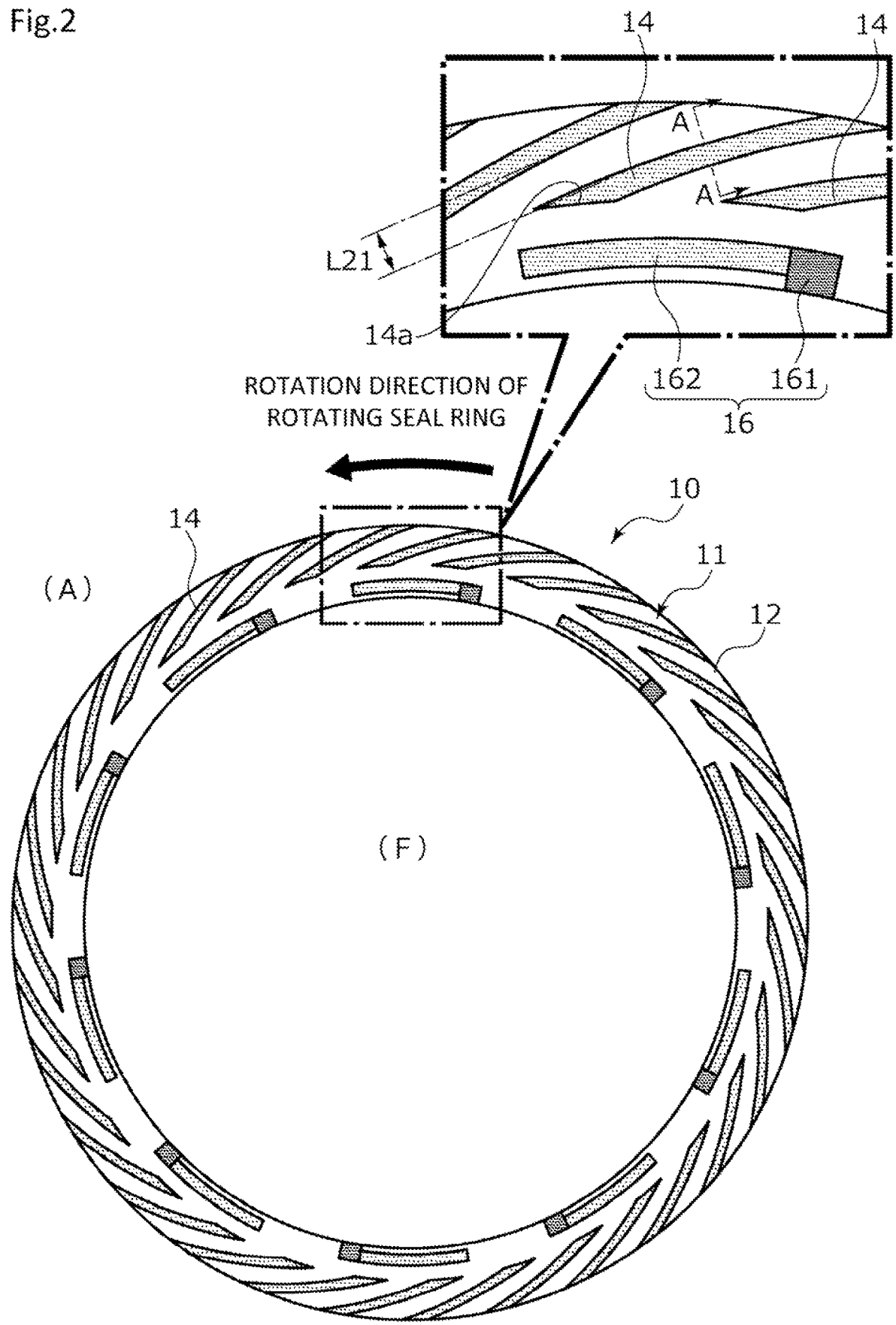
FIG. 2 is a view in which a sliding surface of a stationary seal ring is viewed from the axial direction in the first embodiment.

As illustrated in FIG. 2, the rotating seal ring 20 relatively slides on the stationary seal ring 10 as indicated by an arrow and a plurality of dynamic pressure generation mechanisms 14 and a plurality of specific dynamic pressure generation mechanisms 16 are arranged at equal intervals in the sliding surface 11 of the stationary seal ring 10 in the circumferential direction of the stationary seal ring 10. A portion other than the dynamic pressure generation mechanism 14 and the specific dynamic pressure generation mechanism 16 in the sliding surface 11 is a land 12 that is formed as a flat surface.

The dynamic pressure generation mechanism 14 forms an arc shape having a constant width when viewed from a direction orthogonal to the sliding surface 11, communicates with the atmosphere side corresponding to the outer radial side, and extends to the inner radial side to intersect in the radial direction and the circumferential direction. This dynamic pressure generation mechanism 14 has a constant depth over the entire length and is formed only by a shallow groove that generates a dynamic pressure in the dynamic pressure generation mechanism 14 when the stationary seal ring 10 and the rotating seal ring 20 rotate relative to each other as described below. The dynamic pressure generation mechanism 14 is surrounded by four surfaces including two arc-shaped surfaces of the dynamic pressure generation mechanism 14, a wall portion 14a extending to intersect the arc-shaped surfaces, and a bottom surface parallel to the sliding surface 11 and an inner radial end portion is closed. Further, the dynamic pressure generation mechanism 14 and the specific dynamic pressure generation mechanism 16 are disposed to be separated from the land 12.

Figure 4:
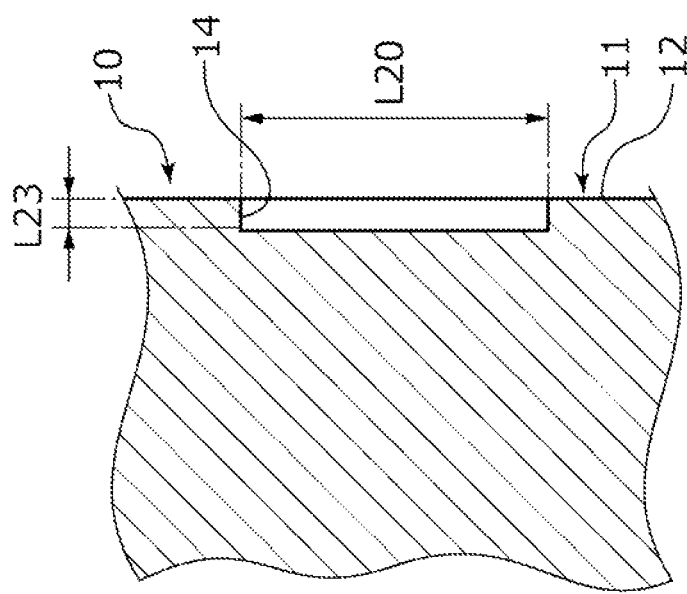
FIG. 4 is a cross-sectional view taken along a line A-A of FIG. 2.

As illustrated in FIG. 4, the dynamic pressure generation mechanism 14 is formed such that a width dimension L20 is 1 mm and a depth dimension L23 is 1 μm. Further, a separation dimension L21 of the adjacent dynamic pressure generation mechanisms 14 is 2 mm. In FIGS. 4 to 8, for convenience of description, the depth dimension is illustrated deeper than the actual dimension.

In addition, the width dimension and the depth dimension of the dynamic pressure generation mechanism 14 may be dimensions in which a dynamic pressure can be generated in the dynamic pressure generation mechanism 14 when the stationary seal ring 10 and the rotating seal ring 20 rotate relative to each other and preferably the width dimension L20 of the dynamic pressure generation mechanism 14 may be formed to be smaller than the width dimension L22 of the deep groove 22 to be described later. Further, the separation dimension L21 of the dynamic pressure generation mechanism 14 can be also freely changed and preferably the separation dimension L21 of the dynamic pressure generation mechanism 14 may be formed to be larger than the width dimension L22 of the deep groove 22 to be described later.

Returning to FIG. 2, the specific dynamic pressure generation mechanism 16 includes a liquid guide groove portion 161 which communicates with the high-pressure side and a Rayleigh step 162 which extends in the circumferential direction to be concentric with the stationary seal ring 10 from the outer radial end portion of the liquid guide groove portion 161 in the rotation direction of the rotating seal ring 20 and is formed in an inverse L shape when viewed from a direction orthogonal to the sliding surface 11. The number of the specific dynamic pressure generation mechanisms 16 is a half or less of the number of the dynamic pressure generation mechanisms 14. The depth dimension of the Rayleigh step 162 is formed to 1 μm so as to be the same as that of the dynamic pressure generation mechanism 14 and the depth dimension of the liquid guide groove portion 161 is formed to 100 μm so as to be deeper than that of the Rayleigh step 162.

Figure 3:
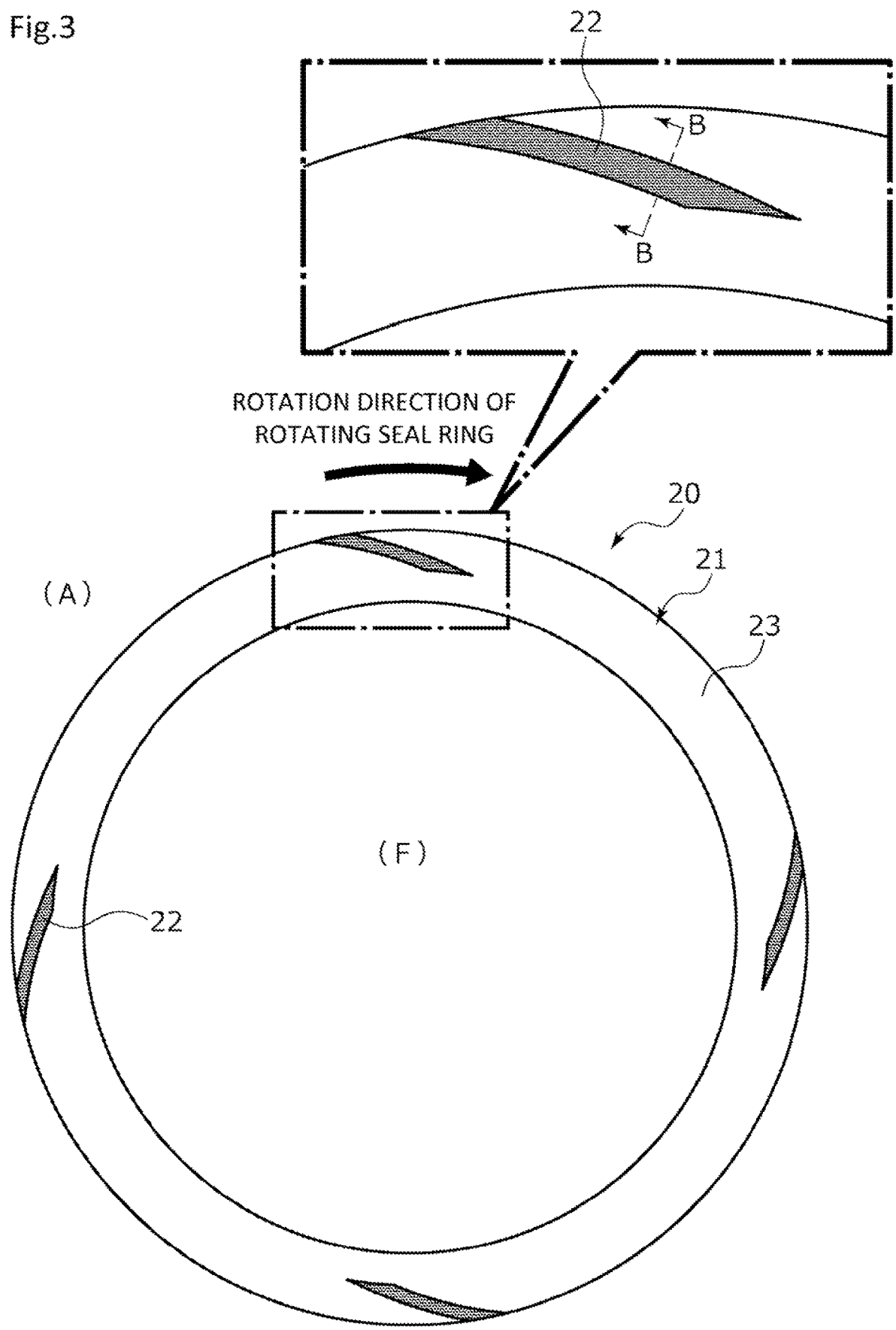
FIG. 3 is a view in which a sliding surface of a rotating seal ring is viewed from the axial direction in the first embodiment.

As illustrated in FIG. 3, four deep grooves 22 are equi-angularly and separately arranged in the sliding surface 21 of the rotating seal ring 20 in the circumferential direction so that the number of the deep grooves is a half or less of the number of the dynamic pressure generation mechanisms 14. A portion other than the deep groove 22 of the sliding surface 21 is a land 23 which is formed as a flat surface.

Figure 5:
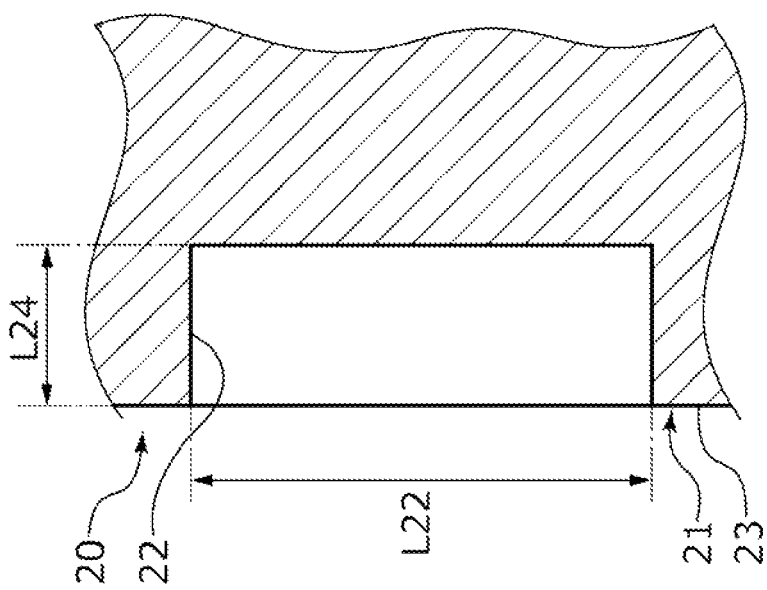
FIG. 5 is a cross-sectional view taken along a line B-B of FIG. 3.

The deep groove 22 has a mirror image relationship and a substantially similar shape with the dynamic pressure generation mechanism 14. Also, the deep groove 22 has an area slightly larger than that of the dynamic pressure generating mechanism 14 when viewed from a direction orthogonal to the sliding surface 21, has an arc shape having a constant width when viewed from a direction orthogonal to the sliding surface 21, communicates with the atmosphere side corresponding to the outer radial side, and extends to the inner radial side to intersect in the radial direction and the circumferential direction. Specifically, the deep groove 22 is surrounded by four surfaces including two arc-shaped surfaces of the deep groove 22, a wall portion extending across the arc-shaped surfaces, and a bottom surface parallel to the sliding surface 21 and the inner radial end portion is closed. In this way, the deep groove 22 is formed such that the outer radial width dimension is slightly larger than the inner radial width dimension in the circumferential direction. As illustrated in FIG. 5, the deep groove 22 is formed such that the radial width dimension L22 is 1.5 mm and the depth dimension L24 is 10 μm. That is, the radial width dimension L22 of the deep groove 22 is larger than the width dimension L20 of the dynamic pressure generation mechanism 14 (L20<L22) and is smaller than the separation dimension L21 between the adjacent dynamic pressure generation mechanisms 14 (L21>L22). Further, the depth dimension L24 of the deep groove 22 is formed to be deeper than the depth dimension L23 of the dynamic pressure generation mechanism 14 (L23<L24).

Further, the depth dimension L24 of the deep groove 22 is set to a depth in which a dynamic pressure is not substantially generated in the deep groove 22 when the stationary seal ring 10 and the rotating seal ring 20 rotate relative to each other. In addition, the width dimension and the depth dimension of the deep groove 22 can be freely changed if a dynamic pressure is not substantially generated in the deep groove 22 when the stationary seal ring 10 and the rotating seal ring 20 rotate relative to each other and the depth dimension L24 of the deep groove 22 is preferably five times or more the depth dimension L23 of the dynamic pressure generation mechanism 14. Further, the radial width dimension L22 of the deep groove 22 can be freely changed as long as the radial width dimension L22 is larger than the width dimension L20 of the dynamic pressure generation mechanism 14.

In addition, the bottom surface of the dynamic pressure generation mechanism 14 is formed as a flat surface and is formed in parallel to the land 12, but does not prevent the flat surface from being provided with fine recessed portions or being formed to be inclined with respect to the land 12. Further, two arc-shaped surfaces of the dynamic pressure generation mechanism 14 extending in the circumferential direction are respectively orthogonal to the bottom surface of the dynamic pressure generation mechanism 14. Further, the bottom surface of the deep groove 22 is formed as a flat surface and is formed in parallel to the land 12, but does not prevent the flat surface from being provided with fine recessed portions or being formed to be inclined with respect to the land 12. Further, each of two arc-shaped surfaces of the deep groove 22 extending in the circumferential direction is orthogonal to the bottom surface of the deep groove 22.

Figure 6:
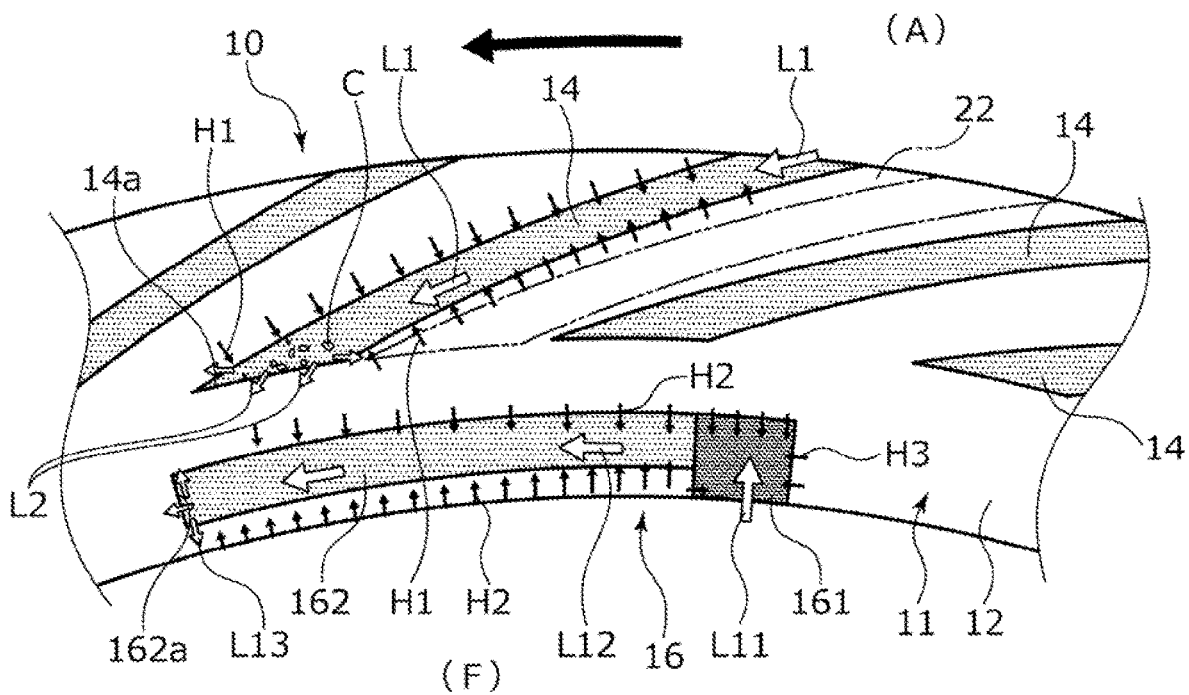
FIG. 6A is a view in which the sliding surface of the stationary seal ring is viewed from the axial direction in a state in which a dynamic pressure generation mechanism does not communicate with a deep groove in the first embodiment and FIG. 6B is a cross-sectional view of the same.
Figure 6:
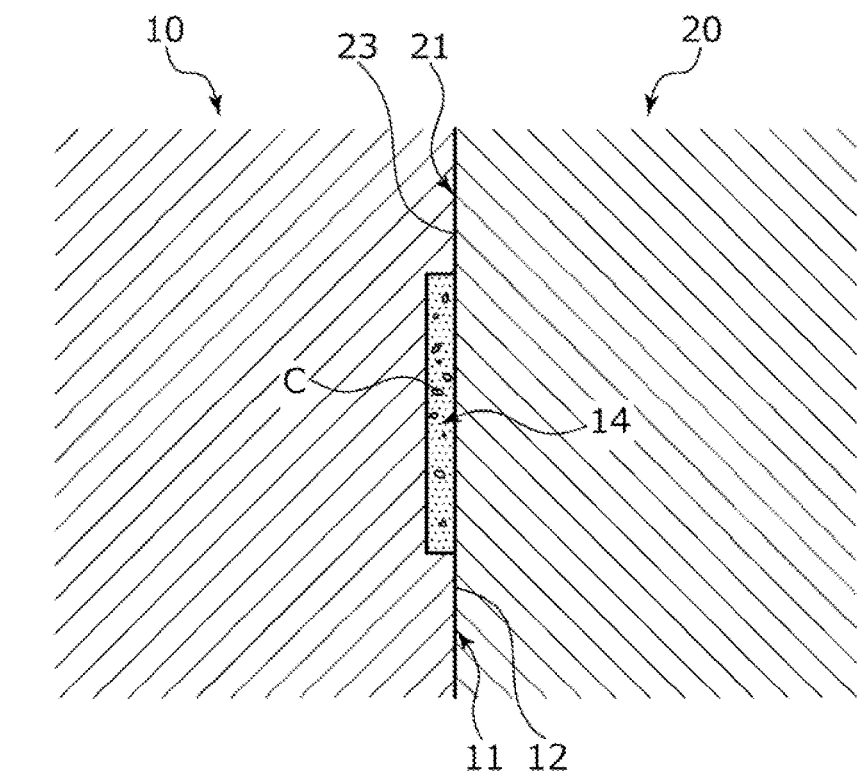
Figure 7:
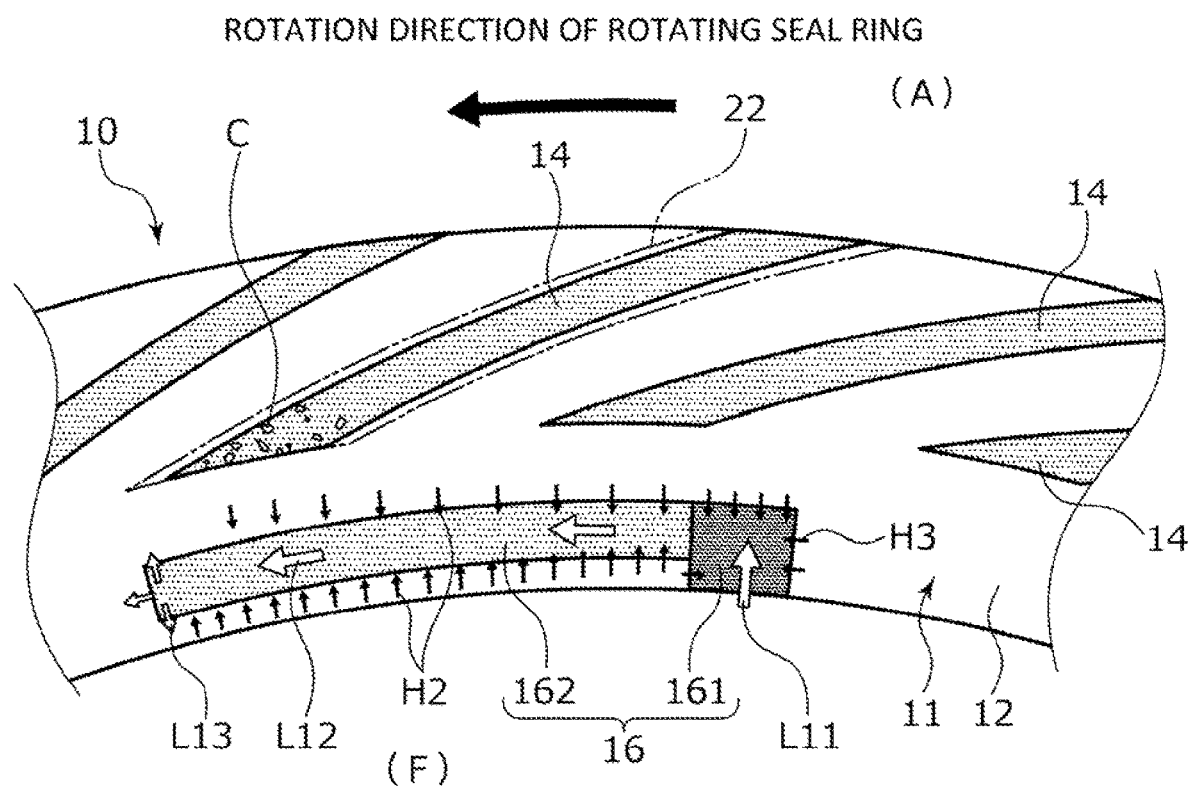
FIG. 7 is a view in which the sliding surface of the stationary seal ring is viewed from the axial direction in a state in which the dynamic pressure generation mechanism communicates with the deep groove in the first embodiment.

As illustrated in FIGS. 6A and 7, the dynamic pressure generation mechanism 14 and the deep groove 22 have a mirror image relationship to face the same direction when the sliding surface 11 of the stationary seal ring 10 faces the sliding surface 21 of the rotating seal ring 20. Further, when the stationary seal ring 10 and the rotating seal ring 20 rotate relative to each other, the dynamic pressure generation mechanism 14 does not overlap with the deep groove 22 when viewed from the axial direction as illustrated in FIG. 6 and the dynamic pressure generation mechanism 14 overlaps with the deep groove 22 when viewed from the axial direction as illustrated in FIG. 7. Since the deep groove 22 is formed to be larger than the dynamic pressure generation mechanism 14 when viewed from the axial direction, the entire area is in an overlapping state when viewed from the axial direction (particularly see FIG. 7A).

Figure 8:
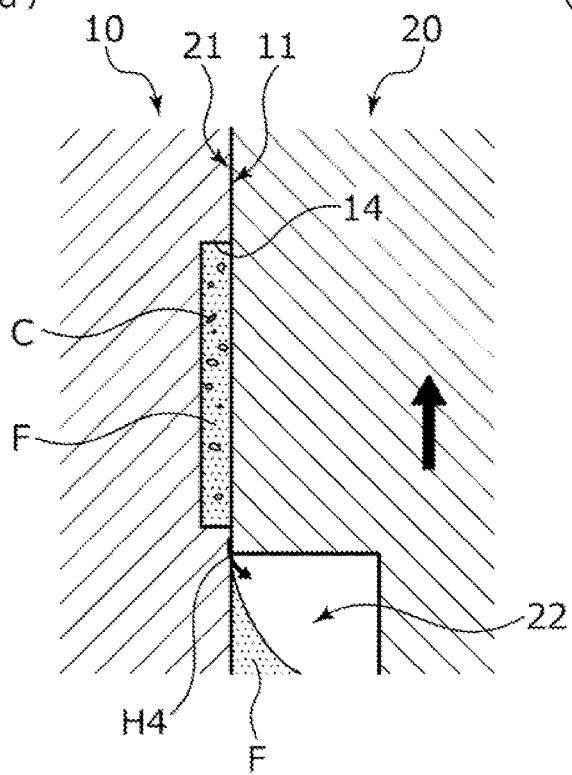
FIGS. 8A to 8D are explanatory diagrams illustrating a series of movement of the deep groove across the dynamic pressure generation mechanism in the first embodiment.
Figure 8:
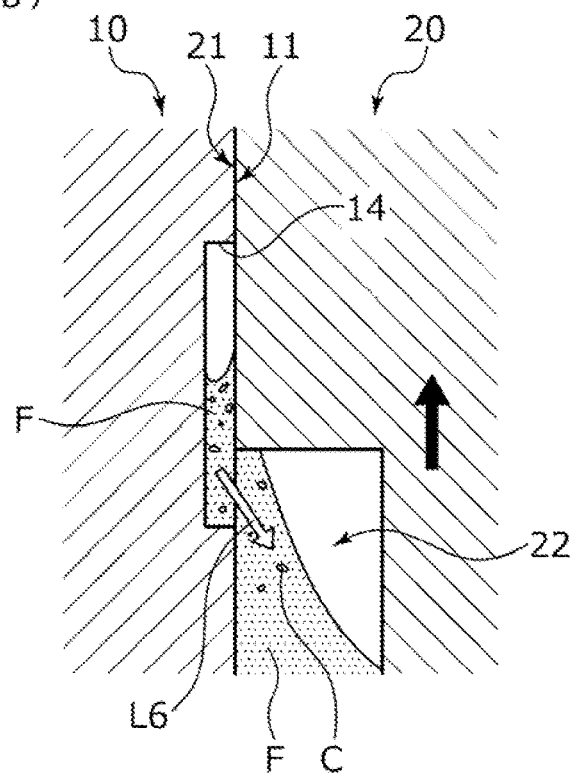
Figure 8:
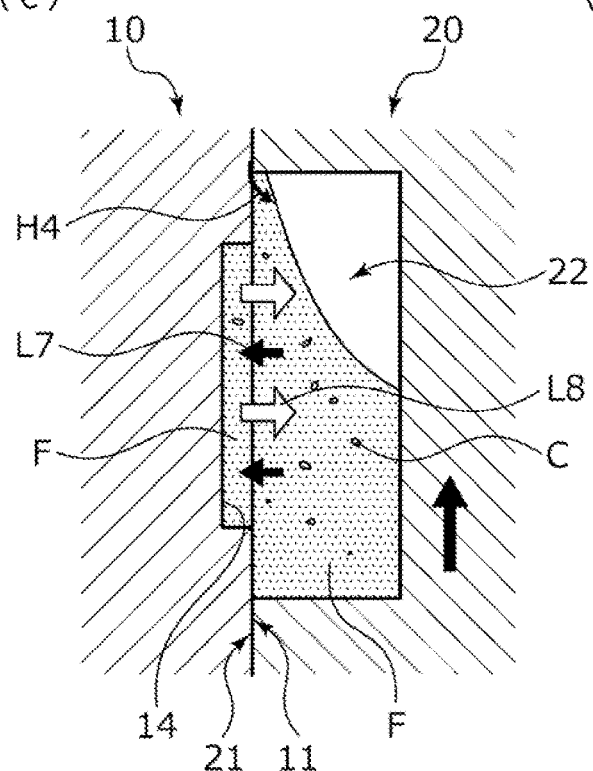
Figure 8:
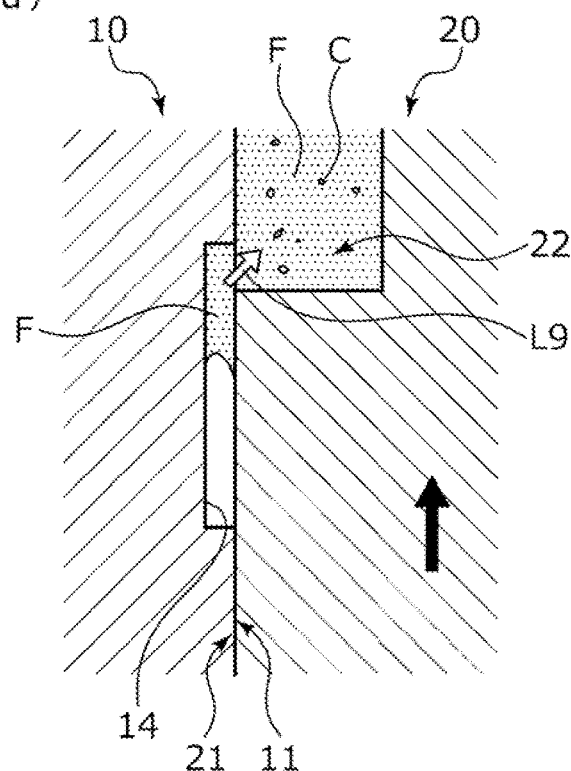
Figure 9:
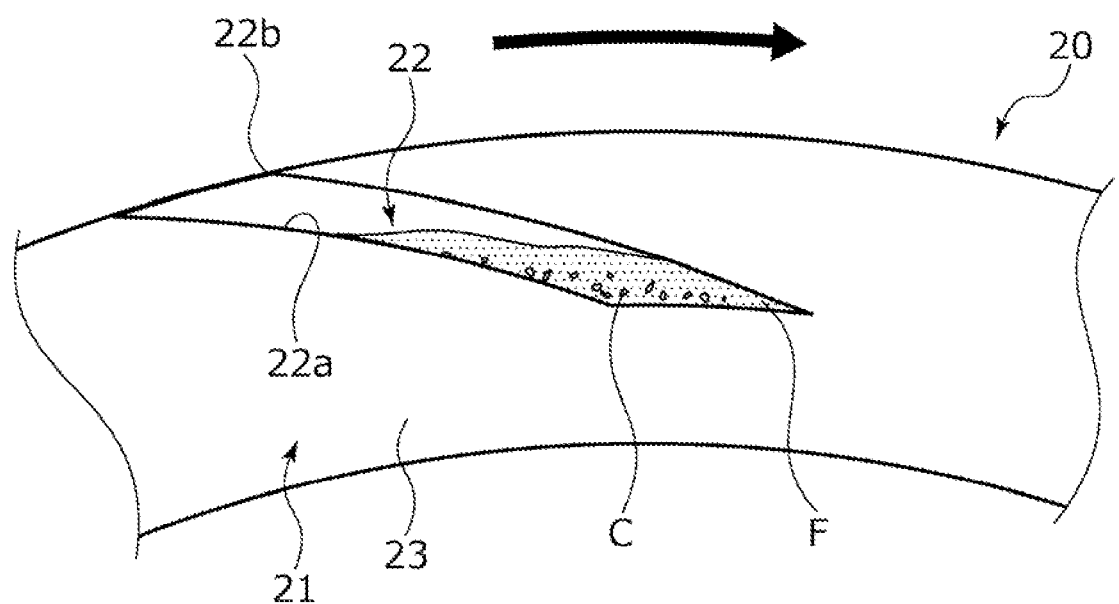
FIGS. 9A and 9B are schematic views illustrating a state in which a sealed liquid containing contamination flowing out to the deep groove is discharged to a leakage side in the first embodiment.
Figure 9:
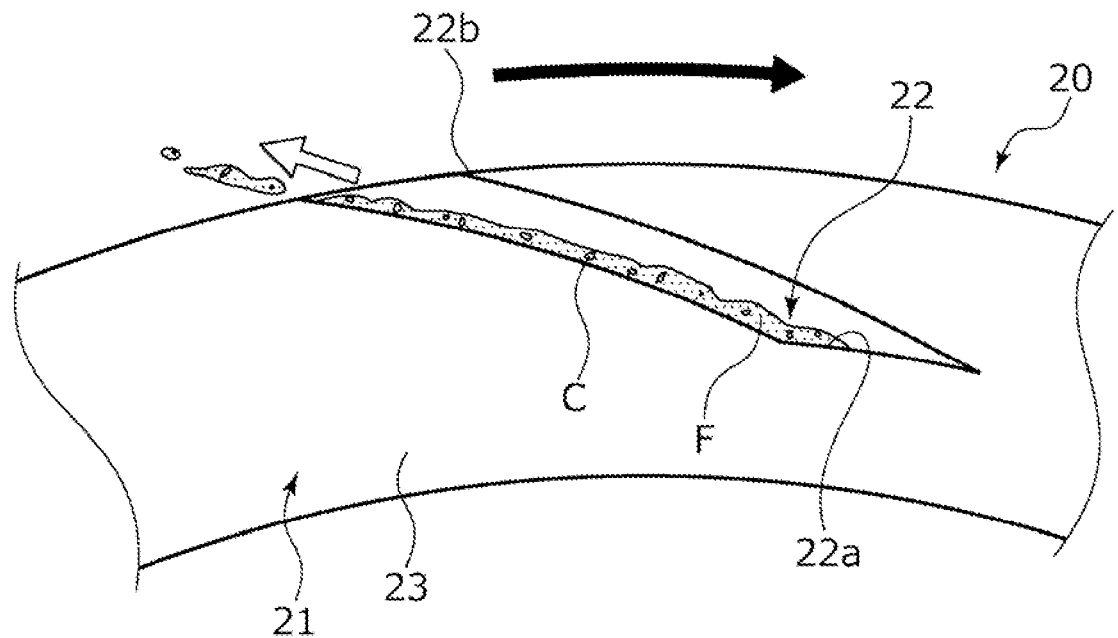

Next, an operation during the relative rotation of the stationary seal ring 10 and the rotating seal ring 20 will be described with reference to FIGS. 6 to 9. In addition, FIGS. 6A and 7A are views in which the sliding surface 11 of the stationary seal ring 10 is viewed from an orthogonal direction and the deep groove 22 of the rotating seal ring 20 is indicated by a two-dotted chain line. Further, FIGS. 6B and 8 are views in which the vicinity of the wall portion 14a of the dynamic pressure generation mechanism 14 is cut.

First, a schematic operation during the relative rotation of the stationary seal ring 10 and the rotating seal ring 20 will be described. When a general industrial machine is in a non-operation state in which the rotating seal ring 20 does not rotate, the sealed liquid F on the inner radial side of the sliding surfaces 11 and 21 slightly enters between the sliding surfaces 11 and 21 due to the capillary phenomenon and the sealed liquid F remaining during the stop of the general industrial machine and the atmosphere entering from the outer radial side of the sliding surfaces 11 and 21 are mixed in the dynamic pressure generation mechanism 14. Similarly, the sealed liquid F remaining during the stop of the general industrial machine and the atmosphere entering from the outer radial side of the sliding surfaces 11 and 21 are also mixed in the deep groove 22. In addition, since the sealed liquid F has higher viscosity than a gas, the leakage amount from the dynamic pressure generation mechanism 14 and the deep groove 22 to the low-pressure side during the stop of the general industrial machine is small.

When the rotating seal ring 20 relatively rotates with respect to the stationary seal ring 10 (see a black arrow) in a case in which almost no sealed liquid F remains in the dynamic pressure generation mechanism 14 during the stop of the general industrial machine, the low-pressure side fluid A on the atmosphere side is introduced from the outer radial side into the dynamic pressure generation mechanism 14 as indicated by an arrow L1 to move in a following manner as illustrated in FIG. 6A so that a dynamic pressure is generated in the dynamic pressure generation mechanism 14.

The pressure is highest in the vicinity of the wall portion 14a which is the downstream end portion of the dynamic pressure generation mechanism 14 and the low-pressure side fluid A flows out from the vicinity of the wall portion 14a to the periphery thereof as indicated by an arrow L2. In addition, the pressure gradually decreases to the upstream side of the dynamic pressure generation mechanism 14.

Further, when the rotating seal ring 20 relatively rotates with respect to the stationary seal ring 10, the high-pressure side sealed liquid F is introduced from the liquid guide groove portion 161 of the specific dynamic pressure generation mechanism 16 as indicated by an arrow L11 and the sealed liquid F moves in a following manner in the rotation direction of the rotating seal ring 20 as indicated by an arrow L12 by the Rayleigh step 162. Accordingly, a dynamic pressure is generated in the Rayleigh step 162 and the sealed liquid F flows out from the vicinity of the wall portion 162a corresponding to the end to the periphery thereof as indicated by an arrow L13. Since the liquid guide groove portion 161 is a deep groove, a large amount of the sealed liquid F can be held and a dynamic pressure can be generated by the Rayleigh step 162 which is a shallow groove communicating with the liquid guide groove portion 161.

When the stationary seal ring 10 and the rotating seal ring 20 rotate relative to each other, the high-pressure sealed liquid F flows between the sliding surfaces 11 and 21 from the inner radial side thereof at any time so that so-called fluid lubrication is performed. At this time, since a high-pressure is formed on the downstream side of the dynamic pressure generation mechanism 14 as described above, as indicated by an arrow H1, the sealed liquid F located in the vicinity of the downstream side of the dynamic pressure generation mechanism 14 almost does not enter the dynamic pressure generation mechanism 14 while being located in the land 12 and the sealed liquid F located in the vicinity of the upstream side of the dynamic pressure generation mechanism 14 gradually enters the dynamic pressure generation mechanism 14 from the upstream end portion of the dynamic pressure generation mechanism 14.

Further, the sealed liquid F in the vicinity of the Rayleigh step 162 almost does not enter the Rayleigh step 162 while being located at the land 12 as indicated by an arrow H2 since a high-pressure is formed on the downstream side of the Rayleigh step 162. On the other hand, the sealed liquid F in the vicinity of the liquid guide groove portion 161 easily enters the liquid guide groove portion 161 as indicated by an arrow H3 since the liquid guide groove portion 161 is a deep groove.

When the stationary seal ring 10 and the rotating seal ring 20 rotate relative to each other to a certain degree, the amount of the sealed liquid F entering the dynamic pressure generation mechanism 14 increases so as to be in a steady state in which the sealed liquid F continuously flows out from the dynamic pressure generation mechanism 14 to a gap between the sliding surfaces 11 and 21. In the steady state, the high-pressure sealed liquid F flows between the sliding surfaces 11 and 21 from the inner radial side thereof or the dynamic pressure generation mechanism 14 at any time so that fluid lubrication is performed as described above. In addition, it is a transient short time from a state where almost no sealed liquid F remains in the dynamic pressure generation mechanism 14 to the steady state. Further, when the sealed liquid F remains in the dynamic pressure generation mechanism 14 during the stop of the general industrial machine, the time until the steady state changes due to the amount of the sealed liquid F remaining in the dynamic pressure generation mechanism 14.

Next, a relationship between the dynamic pressure generation mechanism 14 and the deep groove 22 during the relative rotation of the stationary seal ring 10 and the rotating seal ring 20 will be described.

As illustrated in FIG. 6A, a fluid flow is generated as indicated by an arrow L1 and a dynamic pressure is generated in the dynamic pressure generation mechanism 14 in a state in which the dynamic pressure generation mechanism 14 and the deep groove 22 do not overlap with each other when viewed from the axial direction during the relative rotation of the stationary seal ring 10 and the rotating seal ring 20. At this time, as illustrated in FIGS. 6A and 6B, contamination C mixed in the sealed liquid F due to the flow generated in the dynamic pressure generation mechanism 14 is easily gathered in the vicinity of the wall portion 14a of the dynamic pressure generation mechanism 14. In addition, the sealed liquid F gradually enters the deep groove 22 in a state in which the dynamic pressure generation mechanism 14 and the deep groove 22 do not overlap with each other when viewed from the axial direction.

On the other hand, as illustrated in FIG. 7, the dynamic pressure generation mechanism 14 and the deep groove 22 communicate with each other in the axial direction while the dynamic pressure generation mechanism 14 and the deep groove 22 overlap with each other when viewed from the axial direction during the relative rotation of the stationary seal ring 10 and the rotating seal ring 20.

Specifically, as illustrated in FIG. 8A, the sealed liquid F between the sliding surfaces 11 and 21 gradually enters the deep groove 22 from the upstream side in the relative rotation direction as indicated by an arrow H4 in a state in which the dynamic pressure generation mechanism 14 and the deep groove 22 do not overlap with each other when viewed from the axial direction. In addition, the sealed liquid F in the deep groove 22 is closer to the downstream side in the relative rotation direction and the side of the sliding surface 11. That is, it becomes deepest on the side of the sliding surfaces 11 and 21 on the upstream side in the relative rotation direction in the deep groove 22 and it becomes shallower toward the depth direction of the deep groove 22.

Next, as illustrated in FIG. 8B, when the upstream side in the relative rotation direction of the deep groove 22 partially overlaps with the downstream side in the relative rotation direction of the dynamic pressure generation mechanism 14 in the axial direction and the deep groove 22 partially communicates with the dynamic pressure generation mechanism 14, the pressure in the dynamic pressure generation mechanism 14 changes to be closer to the pressure of the deep groove 22 since the volume of the deep groove 22 is larger than the volume of the dynamic pressure generation mechanism 14. In accordance with a change in pressure, the sealed liquid F of the dynamic pressure generation mechanism 14 strongly flows into the deep groove 22 (see an arrow L6). At this time, the contamination C of the dynamic pressure generation mechanism 14 flows into the deep groove 22 together with the sealed liquid F and is guided inward in the depth direction of the deep groove 22.

Next, as illustrated in FIG. 8C, when the deep groove 22 overlaps with the entire area of the dynamic pressure generation mechanism 14 when viewed from the axial direction, the sealed liquid F in the deep groove 22 returns into the dynamic pressure generation mechanism 14 as indicated by an arrow L7. However, since the contamination C floating in the sealed liquid F is guided inward in the depth direction of the deep groove 22 (see an arrow L8), the contamination C is suppressed from returning into the dynamic pressure generation mechanism 14 together with the sealed liquid F as indicated by an arrow L7. In addition, since the sealed liquid F in the deep groove 22 is almost clean and does not substantially contain the contamination C in a state in which the dynamic pressure generation mechanism 14 and the deep groove 22 do not overlap with each other when viewed from the axial direction as illustrated in FIG. 8A, almost no contamination C flows into the dynamic pressure generation mechanism 14 by the flow indicated by an arrow L7.

Then, in a state in which the deep groove 22 completely crosses over the dynamic pressure generation mechanism 14, the upstream side in the relative rotation direction of the deep groove 22 partially overlaps with the downstream side in the relative rotation direction of the dynamic pressure generation mechanism 14 in the axial direction, and the deep groove 22 and the dynamic pressure generation mechanism 14 partially communicate with each other, a part of the sealed liquid F in the dynamic pressure generation mechanism 14 is collected into the deep groove 22 by a shearing force applied from the rotating seal ring 20 (see an arrow L9). At this time, the contamination C flows into the deep groove 22 together with the sealed liquid F collected into the deep groove 22. That is, the contamination C is not easily accumulated in the dynamic pressure generation mechanism 14. Further, since the sealed liquid F in the dynamic pressure generation mechanism 14 flows into the deep groove 22, returns into the dynamic pressure generation mechanism 14, and moves to flow into the deep groove 22 again as illustrated in FIGS. 8B, 8C, and 8D, the inside of the dynamic pressure generation mechanism 14 is cleaned by the movement of the sealed liquid F.

As illustrated in FIG. 9A, the sealed liquid F containing the contamination C moving from the dynamic pressure generation mechanism 14 into the deep groove 22 is pressed against the side wall 22a on the opposite side in the rotation direction of the rotating seal ring 20 due to a centrifugal force. Then, as illustrated in FIG. 9B, the sealed liquid F containing the contamination C moves to the outer radial side corresponding to the atmosphere side along the side wall 22a by a centrifugal force and is blown and discharged to the atmosphere side from the communication portion 22b with the atmosphere side in the dynamic pressure generation mechanism 14, the contamination C is not easily accumulated in the deep groove 22.

As described above, the sliding surface 11 of the stationary seal ring 10 which is one sliding component is provided with the plurality of dynamic pressure generation mechanisms 14 which function as a shallow groove communicating with the atmosphere side corresponding to the leakage side, the sliding surface 21 of the rotating seal ring 20 which is the other sliding component is provided with the deep groove 22 which has a dimension deeper than the dynamic pressure generation mechanism 14 and communicates with the atmosphere side, and the deep groove 22 overlaps with the dynamic pressure generation mechanism 14 during the relative rotation. Accordingly, when the stationary seal ring 10 and the rotating seal ring 20 rotate relative to each other, the deep groove 22 crosses over the dynamic pressure generation mechanism 14 and the deep groove 22 communicates with the dynamic pressure generation mechanism 14 in the axial direction at that timing. Accordingly, the sealed liquid F moves from the dynamic pressure generation mechanism 14 to the deep groove 22 and the pressure in the dynamic pressure generation mechanism 14 changes to be closer to the pressure in the deep groove 22. Accordingly, a fluid force according to a change in pressure acts on the contamination C flowing into the dynamic pressure generation mechanism 14 and the contamination C is not easily accumulated in the dynamic pressure generation mechanism 14. Further, since the deep groove 22 communicates with the low-pressure side and is deeper than the dynamic pressure generation mechanism 14, a differential pressure between the pressure in the deep groove 22 and the pressure in the dynamic pressure generation mechanism 14 can be reliably generated and the contamination in the dynamic pressure generation mechanism 14 can be easily guided into the deep groove 22.

In addition, in this first embodiment, a case has been described in which a fluid force according to a change in pressure acts on the contamination C flowing into the dynamic pressure generation mechanism 14 so that the contamination C moves from the dynamic pressure generation mechanism 14 into the deep groove 22, but the contamination C may not essentially move into the deep groove 22 if a fluid force according to a change in pressure acts on the contamination C so that the contamination C can be prevented from being fixed to the dynamic pressure generation mechanism 14.

Further, since the dynamic pressure generation mechanism 14 is provided to communicate with the low-pressure side and a dynamic pressure is generated by drawing the sealed liquid F entering the dynamic pressure generation mechanism 14 during the relative rotation of the stationary seal ring 10 and the rotating seal ring 20, the sealed liquid F can be collected and returned between the sliding surfaces 11 and 21 by the dynamic pressure generation mechanism 14 even when the sealed liquid F is supplied to the low-pressure side of the sliding surface 11. Accordingly, the lubricity can be improved in a wide area of the sliding surface 11.

Further, the dynamic pressure generation mechanism 14 and the deep groove 22 extend to face the same direction. Specifically, since the dynamic pressure generation mechanism 14 and the deep groove 22 have a mirror image relationship to face the same direction when the sliding surface 11 of the stationary seal ring 10 and the sliding surface 21 of the rotating seal ring 20 face each other, the dynamic pressure generation mechanism 14 and the deep groove 22 can communicate with each other in a wide region when the dynamic pressure generation mechanism 14 and the deep groove 22 overlap with each other when viewed from the axial direction. Accordingly, since not only the vicinity of the wall portion 14a of the dynamic pressure generation mechanism 14 but also the upstream side of the wall portion 14a of the dynamic pressure generation mechanism 14 communicate with the deep groove 22, the contamination C before reaching the vicinity of the wall portion 14a of the dynamic pressure generation mechanism 14 can be also moved from the dynamic pressure generation mechanism 14 to the deep groove 22.

Further, the width dimension L22 of the deep groove 22 is formed to be longer than the width dimension L20 of the dynamic pressure generation mechanism 14 when viewed from the axial direction. Accordingly, since it is possible to ensure a long time until the deep groove 22 crosses over one dynamic pressure generation mechanism 14, that is, a long time in which the deep groove 22 communicates with the dynamic pressure generation mechanism 14 in the axial direction, the contamination C in the dynamic pressure generation mechanism 14 can easily flow into the deep groove 22. Further, since it is possible to prevent a step which is a throttle from being formed between the dynamic pressure generation mechanism 14 and the deep groove 22, the contamination C can smoothly move to the deep groove 22 by preventing the contamination C moving from the dynamic pressure generation mechanism 14 to the deep groove 22 from being caught by the step.

Further, since the deep groove 22 overlaps with the entire area of the dynamic pressure generation mechanism 14, it is possible to ensure the communication region between the dynamic pressure generation mechanism 14 and the deep groove 22 to the maximum and to allow the contamination C in the dynamic pressure generation mechanism 14 to easily flow into the deep groove 22.

Further, since the separation dimension L21 of the dynamic pressure generation mechanism 14 is larger than the width dimension L22 of the deep groove 22, it is possible to prevent two adjacent dynamic pressure generation mechanisms 14 from communicating with the deep groove 22 at the same time and to reliably generate a differential pressure between the pressure in the deep groove 22 and the pressure in the dynamic pressure generation mechanism 14 when the dynamic pressure generation mechanism 14 communicates with the deep groove 22.

Further, since the number of the deep grooves 22 is smaller than the number of the dynamic pressure generation mechanisms 14, it is possible to ensure a wider region in which the dynamic pressure generation mechanism 14 and the deep groove 22 do not communicate with each other during the relative rotation of the stationary seal ring 10 and the rotating seal ring 20. In other words, the total area of the opening surface of the deep groove 22 is smaller than the total area of the opening surface of the dynamic pressure generation mechanism 14. That is, since it is possible to ensure a state in which the dynamic pressure generation mechanism 14 and the deep groove 22 do not overlap with each other when viewed from the axial direction during the relative rotation of the stationary seal ring 10 and the rotating seal ring 20 and to generate a dynamic pressure in the dynamic pressure generation mechanism 14 when the dynamic pressure generation mechanism 14 and the deep groove 22 do not overlap with each other when viewed from the axial direction, it is possible to prevent deterioration of a function of separating the sliding surfaces 11 and 21 from each other and to maintain the lubricity between the sliding surfaces 11 and 21.

In addition, in this first embodiment, a case has been described in which the number of the deep grooves 22 is four, but the number of the dynamic pressure generation mechanisms 14 and the deep grooves 22 can be freely changed. Preferably, the number of the deep groove 22 may be a half or less of the number of the dynamic pressure generation mechanisms 14.

Further, the deep groove 22 is formed in the rotating seal ring 20 which is rotating and the deep groove 22 and the dynamic pressure generation mechanism 14 formed in the stationary seal ring 10 communicate with the outer radial side. That is, in the outside type mechanical seal that seals the sealed liquid F that tends to leak from the inner radial side of the sliding surfaces 11 and 21 to the outer radial side, it is possible to discharge the contamination C flowing into the deep groove 22 from the communication portion 22b on the outer radial side of the deep groove 22 to the atmosphere side by a centrifugal force and to suppress the contamination C from being accumulated in the deep groove 22.

Further, since the communication portion 22b of the deep groove 22 faces the direction opposite to the rotation direction of the rotating seal ring 20, the sealed liquid F containing the contamination C flowing into the deep groove 22 can be easily discharged from the communication portion 22b on the outer radial side of the deep groove 22 to the atmosphere side by a centrifugal force.

Further, the sliding surface 11 of the stationary seal ring 10 is provided with the specific dynamic pressure generation mechanism 16 which is disposed on the high-pressure side in relation to the dynamic pressure generation mechanism 14 and is independent from the dynamic pressure generation mechanism 14. Accordingly, it is possible to reduce the leakage of the sealed liquid F to the low-pressure side by the dynamic pressure generation mechanism 14 while generating an appropriate liquid film between the sliding surfaces 11 and 21 by separating the sliding surfaces 11 and 21 from each other using the specific dynamic pressure generation mechanism 16 during the relative rotation of the stationary seal ring 10 and the rotating seal ring 20.

In addition, in this first embodiment, although an example has been described in which the dynamic pressure generation mechanism 14 is provided in the stationary seal ring 10 and the deep groove 22 is provided in the rotating seal ring 20, the dynamic pressure generation mechanism 14 may be provided in the rotating seal ring 20, the deep groove 22 may be provided in the stationary seal ring 10, and the dynamic pressure generation mechanism 14 and the deep groove 22 may be provided in both the stationary seal ring 10 and the rotating seal ring 20.

Further, in this first embodiment, a case has been described in which the deep groove 22 overlaps with the entire area of the dynamic pressure generation mechanism 14 when the dynamic pressure generation mechanism 14 and the deep groove 22 overlap with each other when viewed from the axial direction, but the dynamic pressure generation mechanism 14 and the deep groove 22 may partially overlap with each other. For example, the dynamic pressure generation mechanism 14 and the deep groove 22 may face different directions when the sliding surfaces 11 and 21 overlap with each other. Preferably, the radial length of the deep groove 22 may be formed to be equal to or larger than that of the dynamic pressure generation mechanism 14.

Further, in this first embodiment, a case in which the specific dynamic pressure generation mechanism 16 is formed in the sliding surface 11 of the stationary seal ring 10 has been described, but the specific dynamic pressure generation mechanism 16 may be formed in the sliding surface 21 of the rotating seal ring 20.

Second Embodiment

Figure 10:
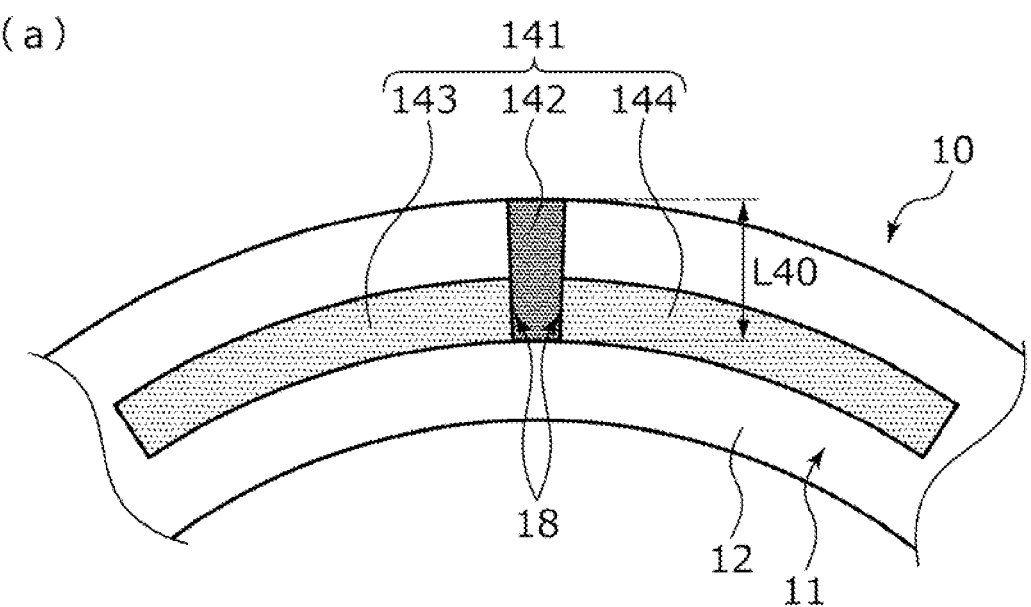
FIG. 10A is a schematic view illustrating a dynamic pressure generation mechanism of sliding components according to a second embodiment of the present invention and FIG. 10B is a schematic view illustrating a deep groove in the second embodiment.
Figure 10:
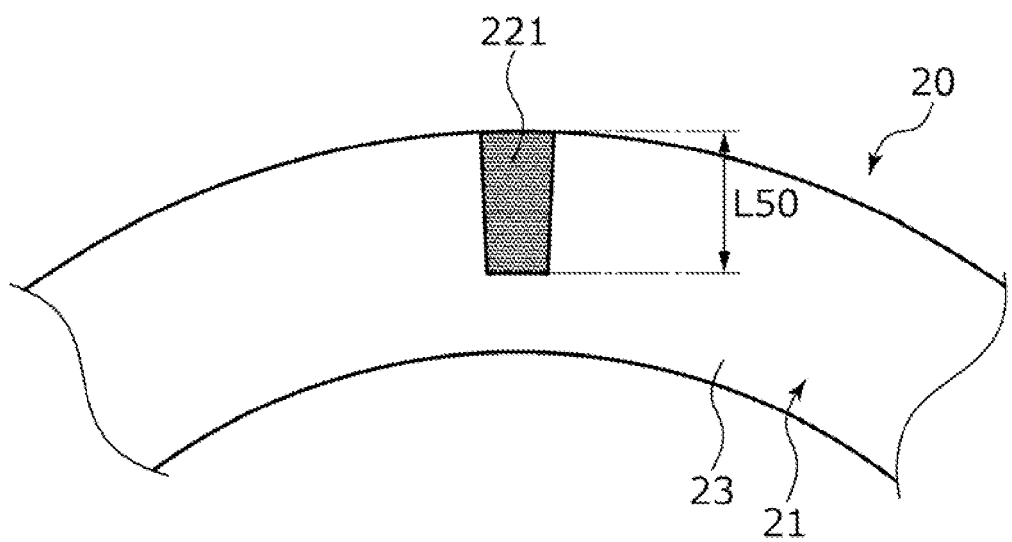
Figure 11:
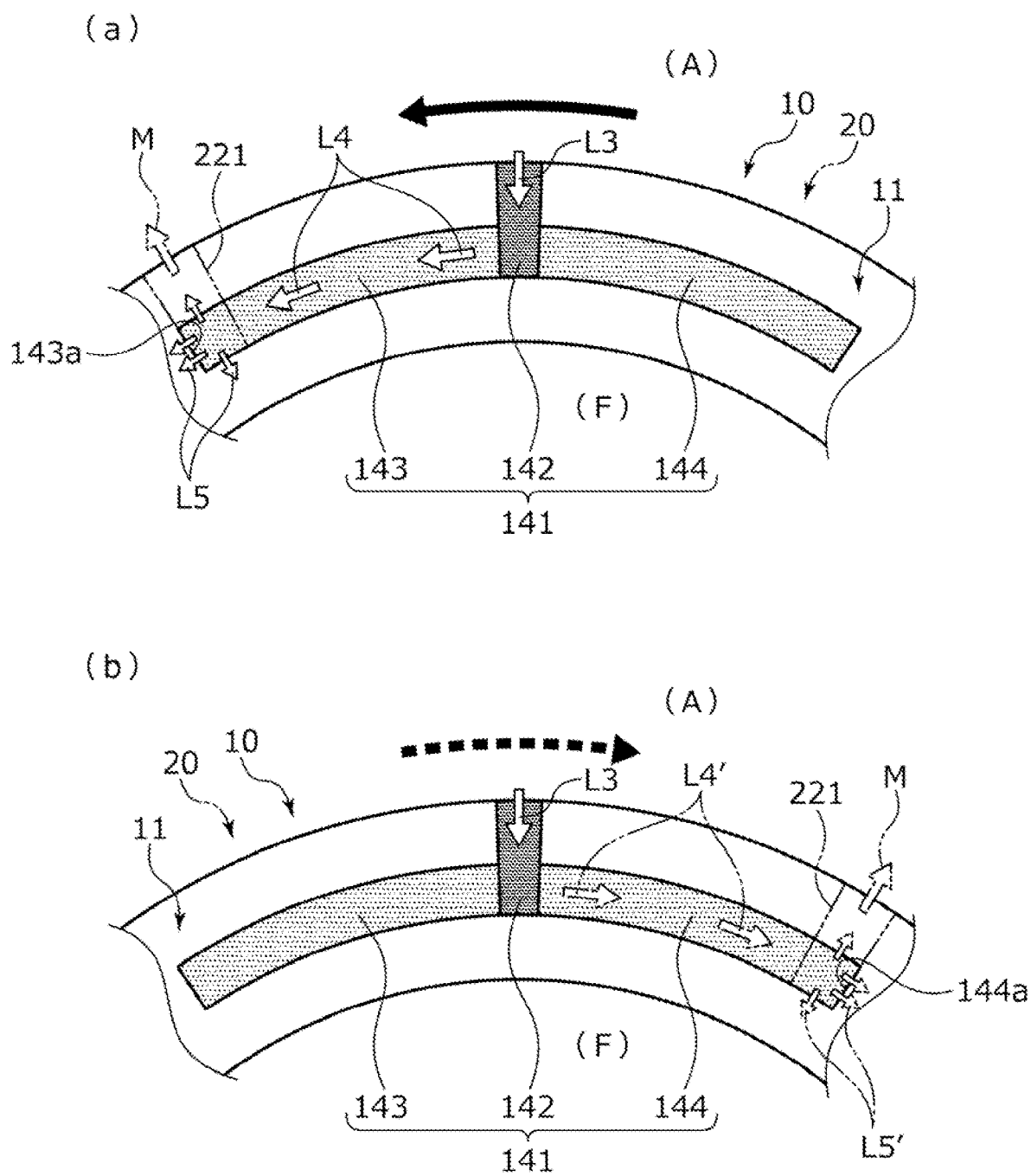
FIG. 11A is a schematic view illustrating a state in which contamination in a Rayleigh step is discharged to a leakage side in the second embodiment and FIG. 11B is a schematic view in which contamination in an inverse Rayleigh step is discharged to a leakage side in the second embodiment.

Next, sliding components according to a second embodiment of the present invention will be described with reference to FIGS. 10 and 11. In addition, the overlapping configuration of the same configuration as that of the above-described embodiment will be omitted.

As illustrated in FIG. 10A, a dynamic pressure generation mechanism 141 includes a liquid guide groove portion 142 which communicates with the atmosphere side and extends in the inner radial direction, a Rayleigh step 143 which is a shallow groove extending in the circumferential direction from the inner radial end portion of the liquid guide groove portion 142 to the downstream side to be concentric with the stationary seal ring 10, and an inverse Rayleigh step 144 which is a shallow groove extending from the inner radial end portion of the liquid guide groove portion 142 to the upstream side in the circumferential direction to be concentric with the stationary seal ring 10. That is, the dynamic pressure generation mechanism 141 is formed in a T shape when viewed from a direction orthogonal to the sliding surface 11.

A depth dimension of the liquid guide groove portion 142 is formed to 100 μm and a depth dimension of each of the Rayleigh step 143 and the inverse Rayleigh step 144 is formed to 1 μm. That is, a step 18 is formed between the liquid guide groove portion 142 and each of the Rayleigh step 143 and the inverse Rayleigh step 144 in the depth direction. Further, a radial length dimension L40 of the liquid guide groove portion 142 is formed to 2 mm.

On the other hand, as illustrated in FIG. 10B, a deep groove 221 communicates with the atmosphere side and extends to be orthogonal to the inner radial direction. A radial length dimension L50 of the deep groove 221 is formed to 2 mm to be the same as the radial length dimension L40 of the liquid guide groove portion 142.

When the rotating seal ring 20 rotates in the counter-clockwise direction of the drawing paper as indicated by a solid arrow of FIG. 11A, the low-pressure side fluid A moves in the order of arrows L3, L4, and L5 so that a dynamic pressure is generated in the Rayleigh step 143. At this time, when the deep groove 221 overlaps with the vicinity of a wall portion 143a corresponding to the end of the Rayleigh step 143 when viewed from the axial direction, the contamination C gathered in the vicinity of the wall portion 143a of the Rayleigh step 143 moves to the deep groove 221 to be discharged to the low-pressure side.

Further, when the rotating seal ring 20 rotates in the clockwise direction of the drawing paper as indicated by a dotted arrow of FIG. 11B, the low-pressure side fluid A moves in the order of arrows L3, L4', and L5' so that a dynamic pressure is generated in the inverse Rayleigh step 144. At this time, when the deep groove 221 overlaps with the vicinity of a wall portion 144a corresponding to the end of the inverse Rayleigh step 144 when viewed from the axial direction, the contamination C gathered in the vicinity of the wall portion 144a of the inverse Rayleigh step 144 moves to the deep groove 221 to be discharged to the low-pressure side. That is, when the rotating seal ring 20 rotates in the clockwise direction of the drawing paper of FIG. 10B, the inverse Rayleigh step 144 functions as a Rayleigh step and the Rayleigh step 143 functions as an inverse Rayleigh step.

In this way, since the Rayleigh step 143 and the inverse Rayleigh step 144 extend from the liquid guide groove portion 142 to both sides in the circumferential direction and any one of the Rayleigh step 143 and the inverse Rayleigh step 144 can be used as a shallow groove for generating a dynamic pressure, these steps can be used regardless of the relative rotation direction of the stationary seal ring 10 and the rotating seal ring 20.

Further, since the radial length dimension L50 of the deep groove 221 is formed to the same dimension as the radial length dimension L40 of the liquid guide groove portion 142, the deep groove 221 communicates with the Rayleigh step 143 and the inverse Rayleigh step 144 in the radial direction and hence the contamination C easily moves to the deep groove 221.

Figure 12:
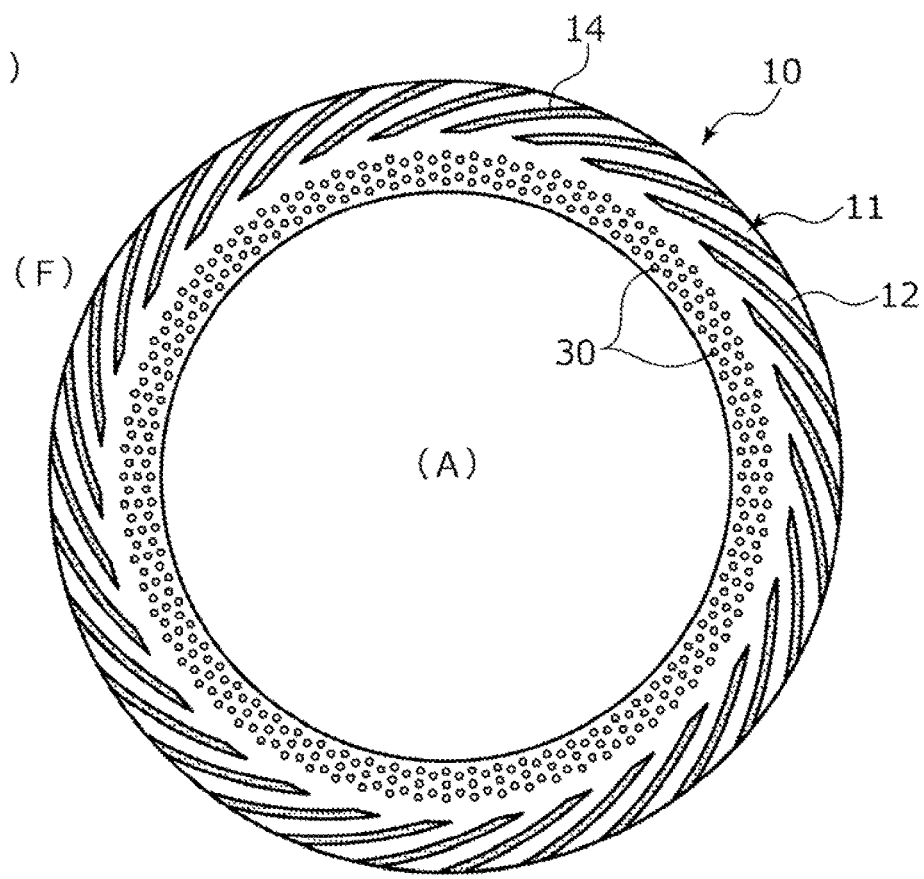
FIG. 12A is an explanatory diagram illustrating a first modified example of the first embodiment and FIG. 12B is an explanatory diagram illustrating a second modified example of the first embodiment.
Figure 12:
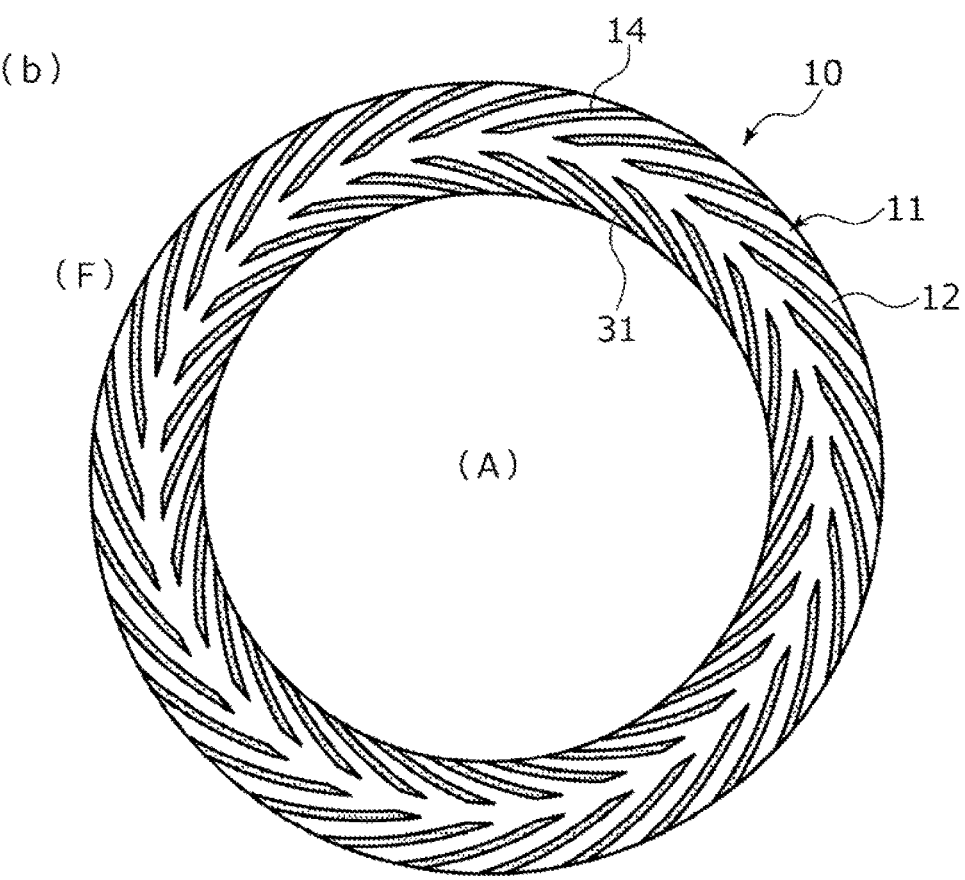

Next, modified examples of the specific dynamic pressure generation mechanism will be described. As illustrated in FIG. 12A, a specific dynamic pressure generation mechanism of a first modified example is a dimple 30 having a circular recess shape when viewed from a direction orthogonal to the sliding surface 11. In addition, the shape, number, arrangement, and the like of the dimple 30 can be freely changed. In addition, the specific dynamic pressure generation mechanism of the first modified example can be employed in the first and second embodiments.

Further, as illustrated in FIG. 12B, a specific dynamic pressure generation mechanism of a second modified example is an arc groove 31 which extends obliquely in an arc shape toward the radial direction. Specifically, the arc groove 31 is provided as many as the dynamic pressure generation mechanism 14, the inner radial end portion communicates with the high-pressure side, and the outer radial end portion is disposed to be separated to the inner radial side in relation to the inner radial end portion of the dynamic pressure generation mechanism 14. That is, the outer radial end portion of the arc groove 31 and the inner radial end portion of the dynamic pressure generation mechanism 14 are partitioned by the land 12. In addition, the size, number, arrangement, and the like of the arc groove 31 can be freely changed. In addition, the specific dynamic pressure generation mechanism of the second modified example can be also employed in the first and second embodiments and when the specific dynamic pressure generation mechanism is employed in the second embodiment, a half of the arc grooves are preferably inclined in the opposite direction to the other half of the arc grooves.

Although the embodiments of the present invention have been described with reference to the drawings, the specific configuration is not limited to these embodiments and any changes or additions that do not deviate from the gist of the present invention are included in the present invention.

For example, in the above-described first and second embodiments, a mechanical seal for general industrial machines has been described as the sliding components, but other mechanical seals for automobiles, water pumps, and the like may be used. Further, the present invention is not limited to the mechanical seal and sliding components other than a mechanical seal such as a slide bearing may be used.

Further, in the first and second embodiments, an outside type mechanical seal that seals the sealed liquid F that tends to leak from the inner radial side of the sliding surfaces 11 and 21 to the outer radial side thereof has been described, but an inside type mechanical seal that seals the sealed liquid F that tends to leak from the outer radial side of the sliding surface to the inner radial side thereof may be used. In addition, even in the inside type mechanical seal, as in the first embodiment, the dynamic pressure generation mechanism may be formed in an arc shape corresponding to one rotation and the dynamic pressure generation mechanism of the second embodiment may be used. Further, the specific dynamic pressure generation mechanism may be formed as in FIG. 11.

Further, in the first and second embodiments, an example has been described in which the sliding components are provided with the plurality of dynamic pressure generation mechanism having the same shape, but may be provided with the plurality of dynamic pressure generation mechanisms having different shapes. Further, the interval and number of the dynamic pressure generation mechanisms can be changed as appropriate.

Further, the specific dynamic pressure generation mechanism does not need to be essentially provided and the configuration of the specific dynamic pressure generation mechanism may be omitted.

Figure 13:
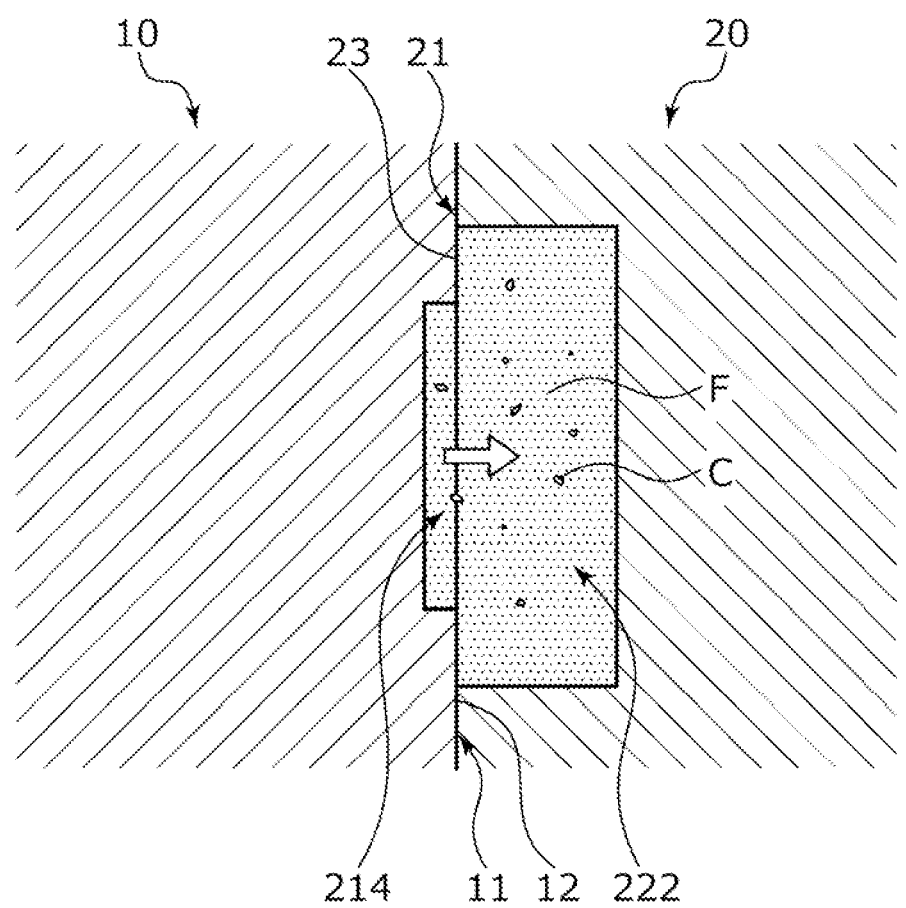
FIG. 13 is an explanatory diagram illustrating a third modified example of the first embodiment.

Further, as in a third modified example illustrated in FIG. 13, a mechanical seal may have a configuration in which a dynamic pressure generation mechanism 241 and a deep groove 222 communicate with a high-pressure side. Also in this case, a liquid flow from the dynamic pressure generation mechanism 241 toward the deep groove 222 is generated due to a pressure difference between the dynamic pressure generation mechanism 241 and the deep groove 222 so that the contamination C in the dynamic pressure generation mechanism 241 can be moved toward the deep groove 222. Further, the dynamic pressure generation mechanism 241 and the deep groove 222 are always filled with the sealed liquid F. Then, since the sealed liquid F generated by the communication between the dynamic pressure generation mechanism 241 and the deep groove 222 flows from the dynamic pressure generation mechanism 241 toward the deep groove 222, the contamination C moved to the deep groove 222 is suppressed from returning to the dynamic pressure generation mechanism 241. In addition, the communication target of the dynamic pressure generation mechanism and the deep groove of the third modified example can be also employed in the first and second embodiments.

Further, although a case has been described in which the sealed fluid side is the high-pressure side and the leakage side is the low-pressure side, the sealed fluid side may be the low-pressure side, the leakage side may be the high-pressure side, and the sealed fluid side and the leakage side may have substantially the same pressure.

Further, in the first and second embodiments and the first to third modified examples, a case in which the sealed fluid is a liquid has been described, but the sealed fluid may be a gas or a mist obtained by mixing a liquid and a gas.

REFERENCE SIGNS LIST

10 Stationary seal ring (First sliding component)
11 Sliding surface
12 Land
14 Dynamic pressure generation mechanism (shallow groove)
16 Specific dynamic pressure generation mechanism
20 Rotating seal ring (Second sliding component)
21 Sliding surface
22 Deep groove
23 Land
30 Dimple (specific dynamic pressure generation mechanism)
31 Arc groove (specific dynamic pressure generation mechanism)
141 Dynamic pressure generation mechanism
143 Rayleigh step (shallow groove)
144 Inverse Rayleigh step (shallow groove)
221 Deep groove

The invention claimed is:

1. A pair of sliding components formed in an annular shape and disposed at a relatively rotating position of a rotary machine,
    wherein the pair of sliding components is constituted by a first sliding component and a second sliding component,
    a sliding surface of the first sliding component is provided with a plurality of dynamic pressure generation mechanisms each of which includes at least a shallow groove communicating with a leakage side,
    a sliding surface of the second sliding component being provided with deep grooves each of which has a dimension deeper than that of the shallow groove of each of the dynamic pressure generation mechanisms and communicates with the leakage side,
    each of the deep grooves overlaps with the shallow groove each of the dynamic pressure generation mechanisms during relative rotation of the first and second sliding components
    the shallow grooves are larger in number than the deep grooves, and
    an area of an opening surface of each of the deep grooves is larger than an area of an opening surface of each of the shallow grooves.

2. The sliding components according to claim 1,
    wherein the shallow groove of each of the dynamic pressure generation mechanisms and each of the deep grooves extend in a same direction.

3. The sliding components according to claim 1,
    wherein an opening width of a portion of each of the deep grooves at least overlapping with a closed end side of the shallow groove of each of the dynamic pressure generation mechanisms is formed to be longer than an opening width of the shallow groove.

4. The sliding components according to claim 1,
    wherein a total area of an opening surface of each of the deep grooves is smaller than a total area of an opening surface of each of the shallow grooves.

5. The sliding components according to claim 1,
wherein the second sliding component is configured to be rotated, the deep groove communicating with an outer radial side of the second sliding component as the leakage side.

6. The sliding components according to claim 1,
wherein the sliding surface of any one of the first and second sliding components is provided with at least one specific dynamic pressure generation mechanism which is disposed on a sealed fluid side with respect to the dynamic pressure generation mechanisms and is independent from the dynamic pressure generation mechanisms.

7. The sliding components according to claim 2,
wherein an opening width of a portion of each of the deep grooves at least overlapping with a closed end side of the shallow groove of each of the dynamic pressure generation mechanisms is formed to be longer than an opening width of the shallow groove.

8. The sliding components according to claim 2,
wherein a total area of an opening surface of each of the deep grooves is smaller than a total area of an opening surface of each of the shallow grooves.

9. The sliding components according to claim 2,
wherein the second sliding component is configured to be rotated, the deep groove communicating with an outer radial side of the second sliding component as the leakage side.

10. The sliding components according to claim 2,
wherein the sliding surface of any one of the first and second sliding components is provided with at least one specific dynamic pressure generation mechanism which is disposed on a sealed fluid side with respect to the dynamic pressure generation mechanisms and is independent from the dynamic pressure generation mechanisms.

11. The sliding components according to claim 3,
wherein a total area of an opening surface of each of the deep grooves is smaller than total area of an opening surface of each of the shallow grooves.

12. The sliding components according to claim 3,
wherein the second sliding component is configured to be rotated, the deep groove communicating with an outer radial side of the second sliding component as the leakage side.

13. The sliding components according to claim 3,
wherein the sliding surface of any one of the first and second sliding components is provided with at least one specific dynamic pressure generation mechanism which is disposed on a sealed fluid side with respect to the dynamic pressure generation mechanisms and is independent from the dynamic pressure generation mechanisms.

14. The sliding components according to claim 4,
wherein the second sliding component is configured to be rotated, the deep groove communicating with an outer radial side of the second sliding component as the leakage side.

15. The sliding components according to claim 4,
wherein the sliding surface of any one of the first and second sliding components is provided with at least one specific dynamic pressure generation mechanism which is disposed on a sealed fluid side with respect to the dynamic pressure generation mechanisms and is independent from the dynamic pressure generation mechanisms.

16. The sliding components according to claim 5,
wherein the sliding surface of any one of the first and second sliding components is provided with at least one specific dynamic pressure generation mechanism which is disposed on a sealed fluid side with respect to the dynamic pressure generation mechanisms and is independent from the dynamic pressure generation mechanisms.

* * * * *